US008086039B2

(12) United States Patent
Kletter

(10) Patent No.: US 8,086,039 B2
(45) Date of Patent: Dec. 27, 2011

(54) FINE-GRAINED VISUAL DOCUMENT FINGERPRINTING FOR ACCURATE DOCUMENT COMPARISON AND RETRIEVAL

(75) Inventor: Doron Kletter, San Mateo, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 12/701,159

(22) Filed: Feb. 5, 2010

(65) Prior Publication Data

US 2011/0194736 A1 Aug. 11, 2011

(51) Int. Cl.
*G06K 9/46* (2006.01)
(52) U.S. Cl. .................. 382/177; 382/180; 382/292
(58) Field of Classification Search .................. 382/177, 382/180, 195, 286, 288, 291, 292
See application file for complete search history.

(56) References Cited

U.S. PATENT DOCUMENTS

| 5,465,303 | A | | 11/1995 | Levison et al. ............... 382/124 |
| 5,491,760 | A | * | 2/1996 | Withgott et al. .............. 382/203 |
| 5,613,014 | A | | 3/1997 | Eshera et al. ................ 382/124 |
| 5,850,476 | A | * | 12/1998 | Chen et al. .................... 382/177 |
| 6,041,133 | A | | 3/2000 | Califano et al. ............. 382/124 |
| 7,359,532 | B2 | | 4/2008 | Acharya et al. .............. 382/124 |
| 2006/0104484 | A1 | | 5/2006 | Bolle et al. ................... 382/115 |
| 2006/0285772 | A1 | * | 12/2006 | Hull et al. .................... 382/305 |
| 2008/0219560 | A1 | * | 9/2008 | Morimoto et al. ............ 382/195 |
| 2008/0317278 | A1 | | 12/2008 | Lefebvre et al. .............. 382/100 |
| 2009/0176566 | A1 | | 7/2009 | Kelly ............................. 463/29 |
| 2009/0324026 | A1 | | 12/2009 | Kletter ......................... 382/124 |
| 2009/0324087 | A1 | | 12/2009 | Kletter ......................... 382/195 |
| 2009/0324100 | A1 | | 12/2009 | Kletter et al. ................ 382/217 |

OTHER PUBLICATIONS

Lepetit et al., "Randomized Trees for Keypoint Recognition"; Proceedings IEEE Computer Society Conference on Computer Vision and Pattern Recognition CVPR05, vol. 2, pp. 775-781, 2005.
Diff PDF, AJC Software, Jan. 24, 2006; http://www.supershareware.com/diff-pdf-free/software/.
Workshare Professional, WorkShare Inc., Apr. 15, 2005, http://web.archive.org/web/20050415102858/http://www.workshare.com/products/wsprofessional/.
Acrobat Professional, Adobe Systems Inc., Nov. 28, 2009, http://web.archive.org/web/20091128011910/http://www.adobe.com/products/acrobatpro/.
Compare PDF, AKS Labs, Oct. 12, 2004, http://web.archive.org/web/2004101204134://http://www.compare-pdf.com/.

* cited by examiner

*Primary Examiner* — Andrew W Johns
(74) *Attorney, Agent, or Firm* — Fay Sharpe LLP

(57) ABSTRACT

A method and system generates fine-grained fingerprints for identifying content in a rendered document. It includes applying image-based techniques to identify patterns in a document rendered by an electronic document rendering system, irrespective of a file format in which the rendered document was electronically created. The applying of the image-based technique includes identifying candidate keypoints at locations in a local image neighborhood of the document, and combining the locations of the candidate keypoints to form a fine-grained fingerprint identifying patterns representing content in the document.

20 Claims, 21 Drawing Sheets

100

Purchase Order: 123456 PO Date: Dec 11, 2008 05:00 PM PST

Party Information

Buyer
N/A 12345678-abcd-1234-efgh
THE AEROSPACE COMPANY
1234 N MAIN ST
BLDG 123 MAILSTOP 456
M789-B123
PORTLAND, USOR 98765
US

Buyer Contact
Jane Doe
BuyerNameorDepartment
TelephoneNumber: 987-654-3210
FaxNumber: 987-654-0123
EmailAddress: jane.doe@aerospace.com

Bill To
Codes assigned by the party originating the mes sage. NA
THIS PURCHASE CONTRACT IS SUBJECT TO AUTOPAY UNLESS AN AEROSPACE INVOICING LOCATION IS NOTED AT THE LINE ITEM LEVEL

Billing Contact

Ship To
Codes assigned by the party originating the mes sage. NA
SEE PURCHASE CONTRACT LINE ITEM

Shipping Contact

General Information

| | | | |
|---|---|---|---|
| **Order Date:** Dec 11, 2008 05:00 PM PST | **Order Type** StandAloneOrder | **Release Number** | **Invoice MediumType** |
| **Account Code** Aerospace.PTLD.ABC-123 | **Allow Partial Shipment** Yes | **Purpose** Original | **Requested Response** |
| Quote Reference Number | Quote Reference Date | **Language** English | **Currency** U.S. Dollar |
| **Requested Delivery Date** | **Requested Ship Date** | **Part Location** | |
| **Supplier Ref No.** | | | |
| **Release Number** | **Contract ID** | | |

Order Totals

Total Amount for the Order: 98,765.4321 U.S. Dollar

| Line Number | Part Number | Description |
|---|---|---|
| 0001 | Seller:<br>Buyer: 9876543-0001<br>Manufacturer: | COMPOSITE ENGINE |

| Unit | Quantity | Unit Price | Amount |
|---|---|---|---|
| Each | 123.0000 | 12.3456 U.S. Dollar | 9,876.5432 U.S. Dollar |

Line Item Schedule

Schedule Line ID:
1
Quantity 123.0000 — UOM Each
Requested Delivery Date
Feb 20, 2009 05:00 PM PST
Notes:
Date Feb 20, 2009 05:00 PM PST — Date Qualifier ContractualDeliveryDate
ABCD Rating

Product Identification

| | | |
|---|---|---|
| **Other Product Qualifier** ContractNumber | **Other Product Code** ABC-01-2345 | **Other Product Code Ext** |
| **Standard Part Number Qualifier** | **Standard Part Number** | **Standard Part Number Ext** |
| **Manufacturer Part Number**<br>**Manufacturer Name** | **Manufacturer Part Number Ext**<br>**Manufacturer ID** | |
| **Off Catalog Flag** true | | |

Page 1 of 7

FIG. 1A

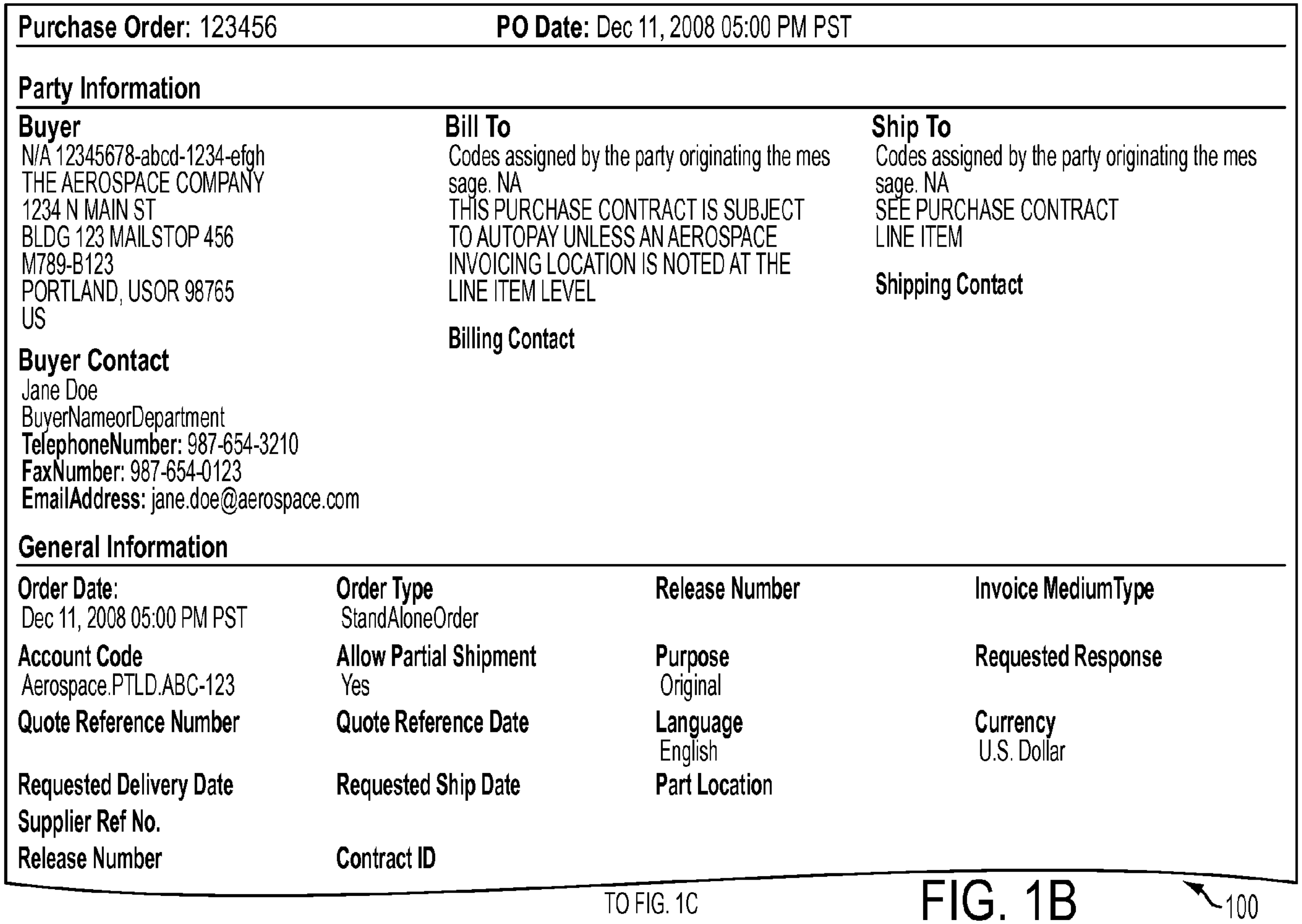
Purchase Order: 123456 PO Date: Dec 11, 2008 05:00 PM PST

Party Information

Buyer
N/A 12345678-abcd-1234-efgh
THE AEROSPACE COMPANY
1234 N MAIN ST
BLDG 123 MAILSTOP 456
M789-B123
PORTLAND, USOR 98765
US

Bill To
Codes assigned by the party originating the mes sage. NA
THIS PURCHASE CONTRACT IS SUBJECT TO AUTOPAY UNLESS AN AEROSPACE INVOICING LOCATION IS NOTED AT THE LINE ITEM LEVEL

Billing Contact

Ship To
Codes assigned by the party originating the mes sage. NA
SEE PURCHASE CONTRACT LINE ITEM

Shipping Contact

Buyer Contact
Jane Doe
BuyerNameorDepartment
TelephoneNumber: 987-654-3210
FaxNumber: 987-654-0123
EmailAddress: jane.doe@aerospace.com

General Information

| | | | |
|---|---|---|---|
| **Order Date:** Dec 11, 2008 05:00 PM PST | **Order Type** StandAloneOrder | **Release Number** | **Invoice MediumType** |
| **Account Code** Aerospace.PTLD.ABC-123 | **Allow Partial Shipment** Yes | **Purpose** Original | **Requested Response** |
| **Quote Reference Number** | **Quote Reference Date** | **Language** English | **Currency** U.S. Dollar |
| **Requested Delivery Date** | **Requested Ship Date** | **Part Location** | |
| **Supplier Ref No.** | | | |
| **Release Number** | **Contract ID** | | |

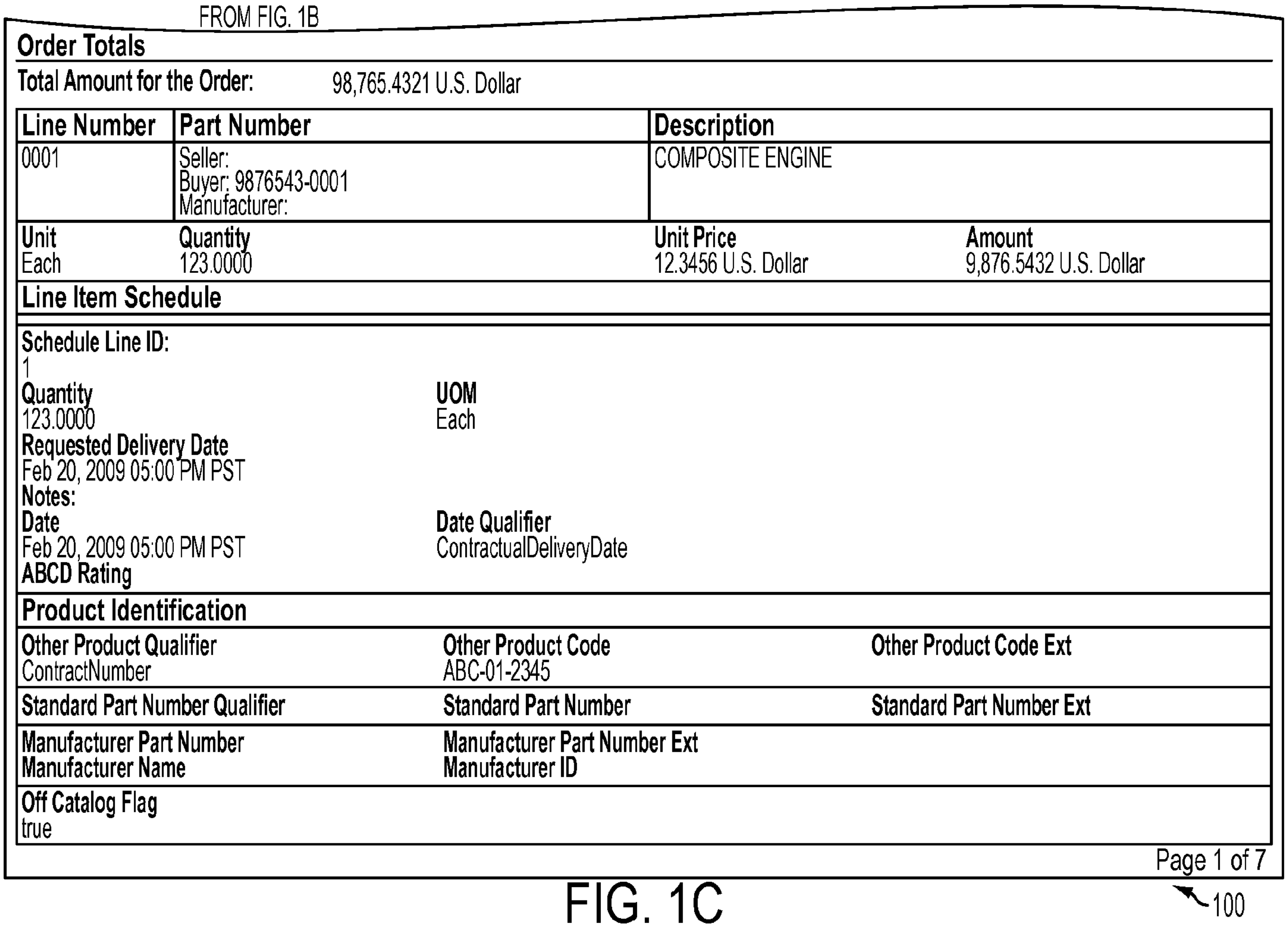

FIG. 1C

FROM FIG. 1B

Order Totals

Total Amount for the Order: 98,765.4321 U.S. Dollar

| Line Number | Part Number | Description |
|---|---|---|
| 0001 | Seller:<br>Buyer: 9876543-0001<br>Manufacturer: | COMPOSITE ENGINE |

| Unit | Quantity | Unit Price | Amount |
|---|---|---|---|
| Each | 123.0000 | 12.3456 U.S. Dollar | 9,876.5432 U.S. Dollar |

Line Item Schedule

Schedule Line ID:
1

Quantity                    UOM
123.0000                    Each

Requested Delivery Date
Feb 20, 2009 05:00 PM PST

Notes:
Date                                    Date Qualifier
Feb 20, 2009 05:00 PM PST               ContractualDeliveryDate
ABCD Rating

Product Identification

| Other Product Qualifier | Other Product Code | Other Product Code Ext |
|---|---|---|
| ContractNumber | ABC-01-2345 | |

| Standard Part Number Qualifier | Standard Part Number | Standard Part Number Ext |
|---|---|---|

Manufacturer Part Number        Manufacturer Part Number Ext
Manufacturer Name               Manufacturer ID Off Catalog Flag
true Page 1 of 7

↙100

| Change Order: 123456 | CO Date: Dec 15, 2008 05:00 PM PST | | CO Sequence: 002 |
|---|---|---|---|
| **Party Information** | | | |
| **Buyer** <br> N/A 12345678-abcd-1234-efgh <br> THE AEROSPACE COMPANY <br> 1234 N MAIN ST <br> BLDG 123 MAILSTOP 456 <br> M789-B123 <br> PORTLAND, USOR 98765 <br> US <br><br> **Buyer Contact** <br> Jane Doe <br> BuyerNameorDepartment <br> TelephoneNumber: 987-654-3210 <br> FaxNumber: 987-654-0123 <br> EmailAddress: jane.doe@aerospace.com | **Bill To** <br> Codes assigned by the party originating the message. NA <br> THIS PURCHASE CONTRACT IS SUBJECT TO AUTOPAY UNLESS AN AEROSPACE INVOICING LOCATION IS NOTED AT THE LINE ITEM LEVEL <br><br> **Billing Contact** | | **Ship To** <br> Codes assigned by the party originating the message. NA <br> SEE PURCHASE CONTRACT LINE ITEM <br><br> **Shipping Contact** |
| **General Information** | | | |
| Purchase Order Number: <br> 123456 | Purchase Order Date: <br> Dec 11, 2008 05:00 PM PST | | |
| Change Order Date: <br> Dec 15, 2008 05:00 PM PST | Order Type <br> ChangeToPurchaseOrder | Release Number | Invoice MediumType |
| Account Code <br> Aerospace.PTLD.ABC-123 | Allow Partial Shipment <br> Yes | Purpose <br> Change | Requested Response |
| Quote Reference Number | Quote Reference Date | Language <br> English | Currency <br> U.S. Dollar |
| Requested Delivery Date | Requested Ship Date | Part Location | |
| Supplier Ref No. | | | |
| Release Number | Contract ID | | |
| **Order Totals** | | | |
| Total Amount for the Order: | 98,765.4321 U.S. Dollar | | |

| Line Number | Part Number | Description | |
|---|---|---|---|
| 0001 | Seller: <br> Buyer: 9876543-0001 <br> Manufacturer: | COMPOSITE ENGINE | |
| Unit <br> Each | Quantity <br> 123.0000 | Unit Price <br> 12.3456 U.S. Dollar | Amount <br> 9,876.5432 U.S. Dollar |
| Change Type <br> ChangesToLineItems | | | |

| Line Item Schedule |
|---|

| Schedule Line ID: <br> 1 | | |
|---|---|---|
| Quantity <br> 123.0000 | UOM <br> Each | |
| * Requested Delivery Date <br> Jun 13, 2009 05:00 PM PST | | |
| Notes: | | |
| * Date <br> Jun 13, 2009 05:00 PM PST | Date Qualifier <br> ContractualDeliveryDate | |
| ABCD Rating | | |

| Product Identification | | |
|---|---|---|
| Other Product Qualifier <br> ContractNumber | Other Product Code <br> ABC-01-2345 | Other Product Code Ext |
| Standard Part Number Qualifier | Standard Part Number | Standard Part Number Ext |

Page 1 of 7

FIG. 2A

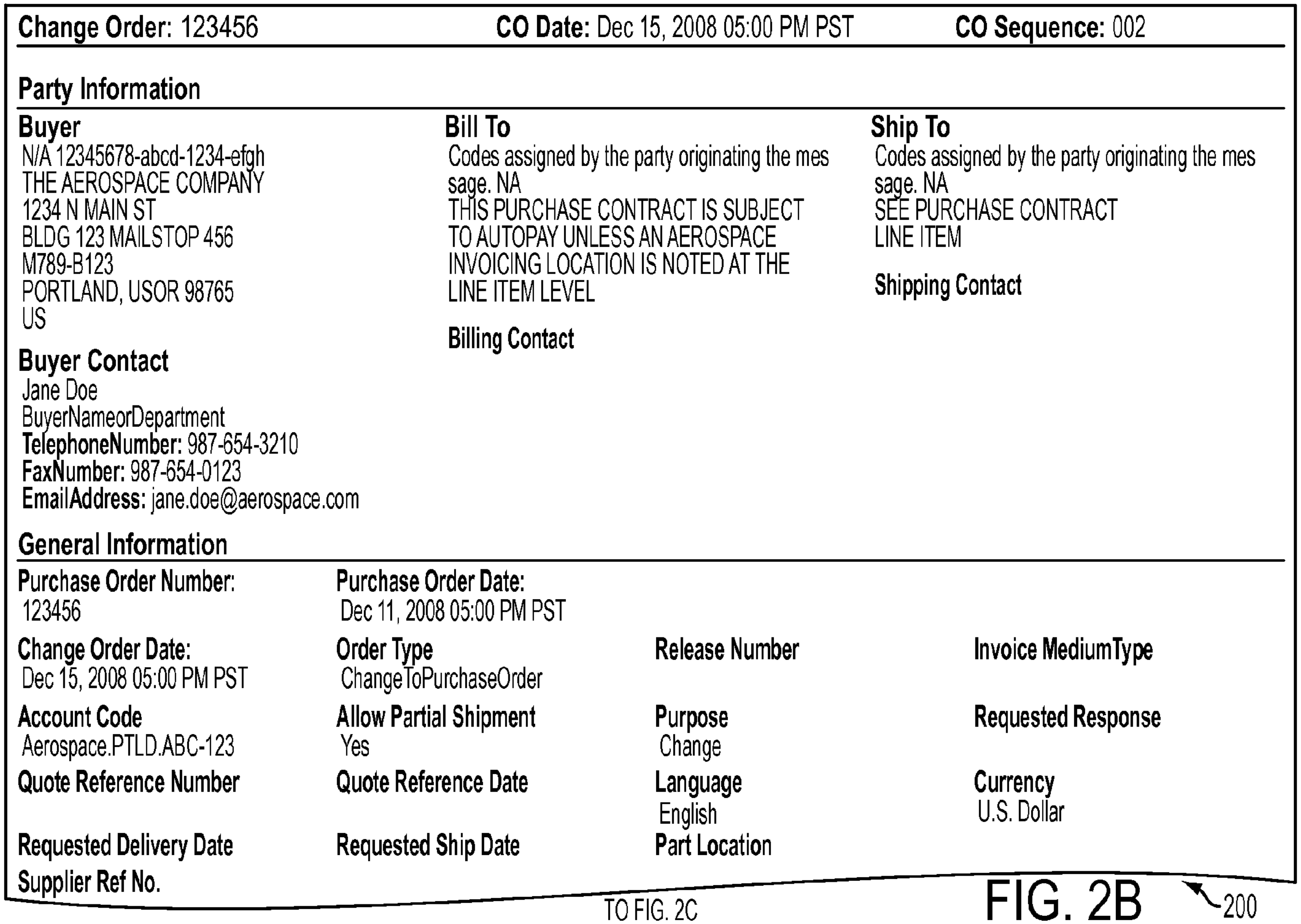

Change Order: 123456 CO Date: Dec 15, 2008 05:00 PM PST CO Sequence: 002

Party Information

Buyer
N/A 12345678-abcd-1234-efgh
THE AEROSPACE COMPANY
1234 N MAIN ST
BLDG 123 MAILSTOP 456
M789-B123
PORTLAND, USOR 98765
US Buyer Contact
Jane Doe
BuyerNameorDepartment
TelephoneNumber: 987-654-3210
FaxNumber: 987-654-0123
EmailAddress: jane.doe@aerospace.com Bill To
Codes assigned by the party originating the mes sage. NA
THIS PURCHASE CONTRACT IS SUBJECT TO AUTOPAY UNLESS AN AEROSPACE INVOICING LOCATION IS NOTED AT THE LINE ITEM LEVEL Billing Contact Ship To
Codes assigned by the party originating the mes sage. NA
SEE PURCHASE CONTRACT LINE ITEM Shipping Contact General Information

| | | | |
|---|---|---|---|
| Purchase Order Number: 123456 | Purchase Order Date: Dec 11, 2008 05:00 PM PST | | |
| Change Order Date: Dec 15, 2008 05:00 PM PST | Order Type ChangeToPurchaseOrder | Release Number | Invoice MediumType |
| Account Code Aerospace.PTLD.ABC-123 | Allow Partial Shipment Yes | Purpose Change | Requested Response |
| Quote Reference Number | Quote Reference Date | Language English | Currency U.S. Dollar |
| Requested Delivery Date | Requested Ship Date | Part Location | |
| Supplier Ref No. | | | |

FROM FIG. 2B

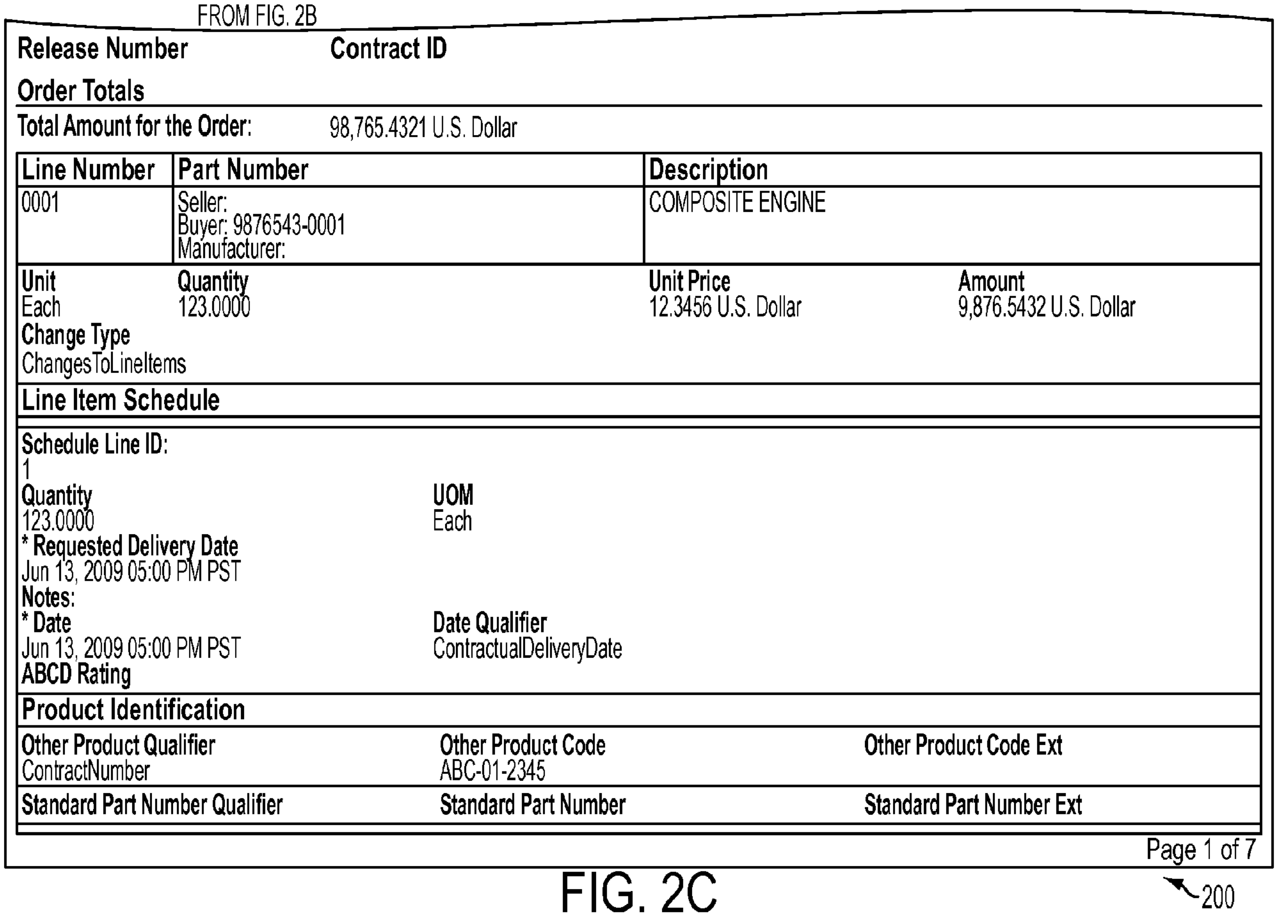

FIG. 2C

FROM FIG. 2B

| Release Number | Contract ID | |
|---|---|---|

Order Totals

Total Amount for the Order: 98,765.4321 U.S. Dollar

| Line Number | Part Number | Description |
|---|---|---|
| 0001 | Seller:<br>Buyer: 9876543-0001<br>Manufacturer: | COMPOSITE ENGINE |

| Unit | Quantity | Unit Price | Amount |
|---|---|---|---|
| Each | 123.0000 | 12.3456 U.S. Dollar | 9,876.5432 U.S. Dollar |

Change Type
ChangesToLineItems

Line Item Schedule

Schedule Line ID:
1

| Quantity | UOM |
|---|---|
| 123.0000 | Each |

*Requested Delivery Date
Jun 13, 2009 05:00 PM PST

Notes:

| *Date | Date Qualifier |
|---|---|
| Jun 13, 2009 05:00 PM PST | ContractualDeliveryDate |

ABCD Rating

Product Identification

| Other Product Qualifier | Other Product Code | Other Product Code Ext |
|---|---|---|
| ContractNumber | ABC-01-2345 | |

| Standard Part Number Qualifier | Standard Part Number | Standard Part Number Ext |
|---|---|---|

Page 1 of 7

200

Purchase Order: 1234456  PO Date: Dec 11, 2008 05:00 PM PST

Party Information

Buyer
N/A 12345678-abcd-1234-efgh
THE AEROSPACE COMPANY
1234 N MAIN ST
BLDG 123 MAILSTOP 456
M789-B123
PORTLAND, USOR 98765
US

Buyer Contact
Jane Doe
BuyerNameorDepartment
TelephoneNumber: 987-654-3210
FaxNumber: 987-654-0123
EmailAddress: jane.doe@aerospace.com

Bill To
Codes assigned by the party originating the mes
sage. NA
THIS PURCHASE CONTRACT IS SUBJECT
TO AUTOPAY UNLESS AN AEROSPACE
INVOICING LOCATION IS NOTED AT THE
LINE ITEM LEVEL Billing Contact

Ship To
Codes assigned by the party originating
the message. NA
SEE PURCHASE CONTRACT
LINE ITEM Shipping Contact

TO FIG. 3C

General Information

Order Date:
Dec 11, 2008 05:00 PM PST

Account Code
Aerospace.PTLD.ABC-123

Quote Reference Number

Requested Delivery Date

Supplier Ref No.

Order Type
StandAloneOrder

Allow Partial Shipment
Yes

Quote Reference Date

Requested Ship Date

Release Number

Purpose
Original

Language
English

Part Location

Invoice MediumType

Requested Response

Currency
U.S. Dollar

300

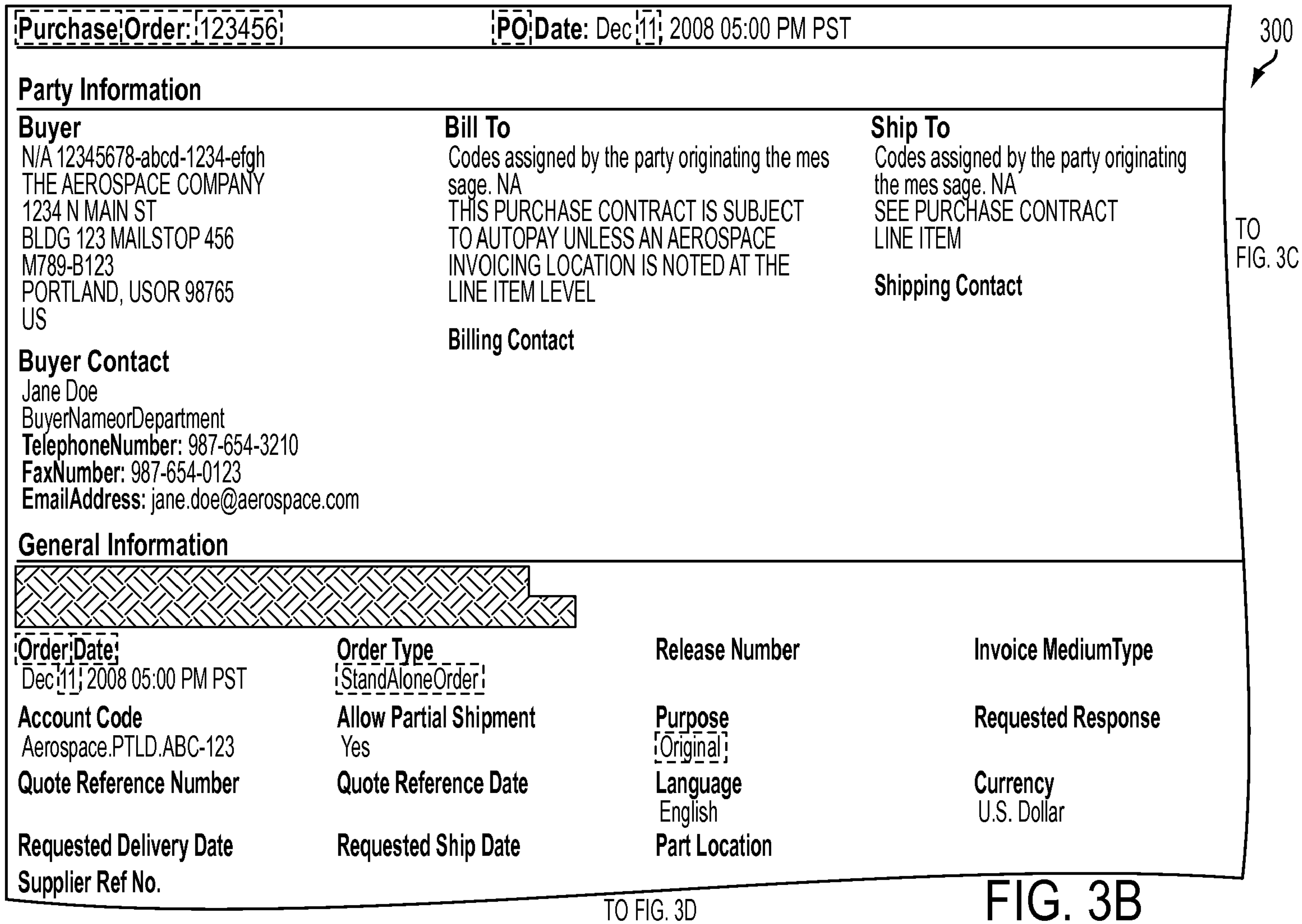

FIG. 3B

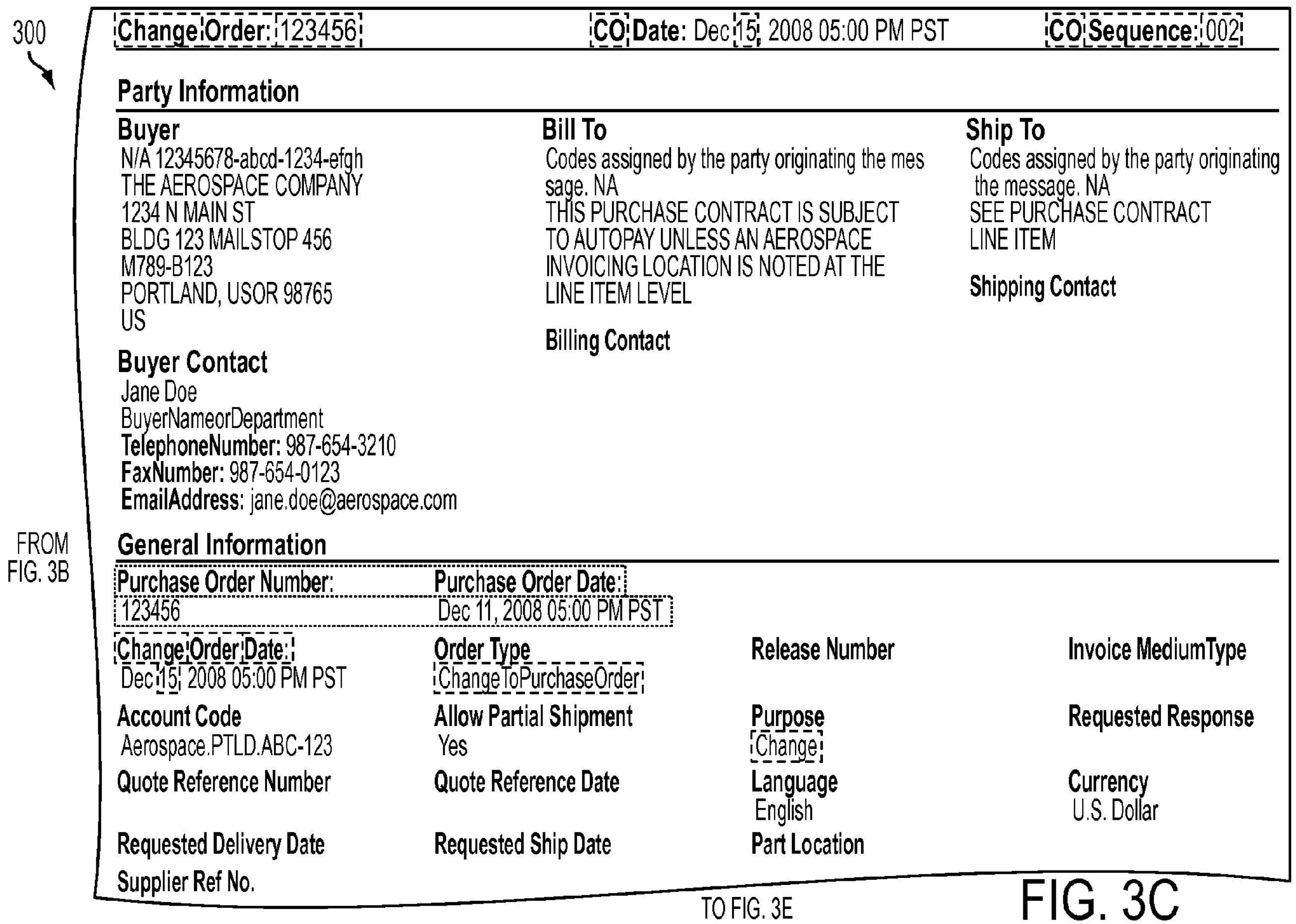

FIG. 3C

Party Information

| Change Order: 123456 | CO Date: Dec 15, 2008 05:00 PM PST | CO Sequence: 002 |

Buyer
N/A 12345678-abcd-1234-efgh
THE AEROSPACE COMPANY
1234 N MAIN ST
BLDG 123 MAILSTOP 456
M789-B123
PORTLAND, USOR 98765
US

Buyer Contact
Jane Doe
BuyerNameorDepartment
TelephoneNumber: 987-654-3210
FaxNumber: 987-654-0123
EmailAddress: jane.doe@aerospace.com

Bill To
Codes assigned by the party originating the message. NA
THIS PURCHASE CONTRACT IS SUBJECT TO AUTOPAY UNLESS AN AEROSPACE INVOICING LOCATION IS NOTED AT THE LINE ITEM LEVEL Billing Contact

Ship To
Codes assigned by the party originating the message. NA
SEE PURCHASE CONTRACT LINE ITEM Shipping Contact

General Information

Purchase Order Number:
123456

Change Order Date:
Dec 15, 2008 05:00 PM PST

Purchase Order Date:
Dec 11, 2008 05:00 PM PST

Account Code
Aerospace.PTLD.ABC-123

Order Type
Change to Purchase Order

Quote Reference Number

Allow Partial Shipment
Yes

Quote Reference Date

Release Number

Purpose
Change

Language
English

Invoice MediumType

Requested Response

Currency
U.S. Dollar

Requested Delivery Date

Requested Ship Date

Part Location

Supplier Ref No.

FROM FIG. 3B     TO FIG. 3E

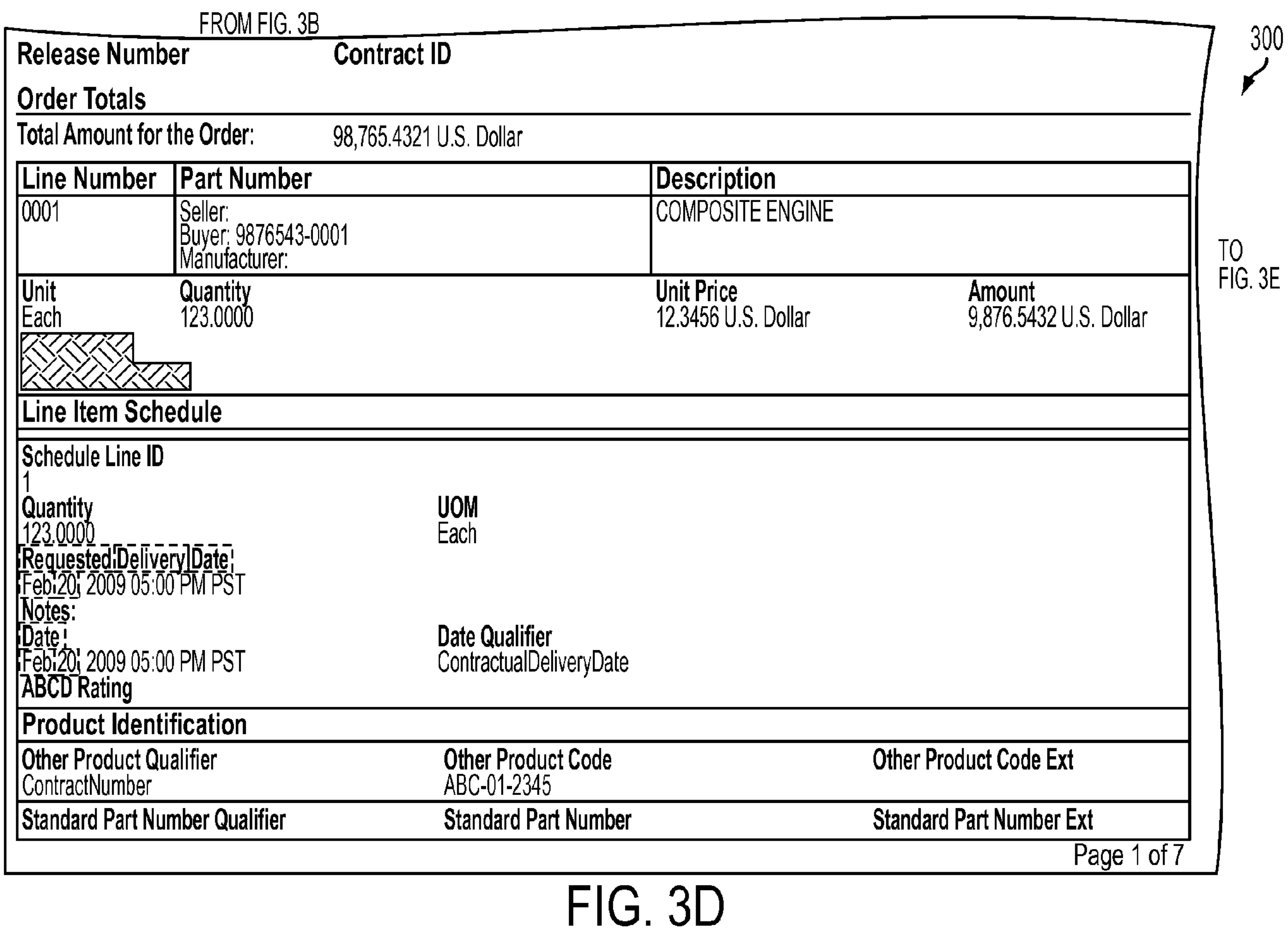

FROM FIG. 3B

| Release Number | Contract ID | | |
|---|---|---|---|
| **Order Totals** | | | |
| Total Amount for the Order: | 98,765.4321 U.S. Dollar | | |

| Line Number | Part Number | | Description | |
|---|---|---|---|---|
| 0001 | Seller:<br>Buyer: 9876543-0001<br>Manufacturer: | | COMPOSITE ENGINE | |
| Unit<br>Each | Quantity<br>123.0000 | | Unit Price<br>12.3456 U.S. Dollar | Amount<br>9,876.5432 U.S. Dollar |

Line Item Schedule

| Schedule Line ID | | | |
|---|---|---|---|
| 1 | | | |
| Quantity<br>123.0000 | UOM<br>Each | | |
| Requested Delivery Date<br>Feb 20, 2009 05:00 PM PST | | | |
| Notes: | | | |
| Date<br>Feb 20, 2009 05:00 PM PST | Date Qualifier<br>ContractualDeliveryDate | | |
| ABCD Rating | | | |

Product Identification

| Other Product Qualifier<br>ContractNumber | Other Product Code<br>ABC-01-2345 | Other Product Code Ext |
|---|---|---|
| Standard Part Number Qualifier | Standard Part Number | Standard Part Number Ext |

Page 1 of 7

TO FIG. 3E

FROM FIG. 3C

| Release Number | Contract ID | | |
|---|---|---|---|
| **Order Totals** | | | |
| Total Amount for the Order: | 98,765.4321 U.S. Dollar | | |
| Line Number | Part Number | Description | |
| 0001 | Seller: <br> Buyer: 9876543-0001 <br> Manufacturer: | COMPOSITE ENGINE | |
| Unit <br> Each | Quantity <br> 123.0000 | Unit Price <br> 12.3456 U.S. Dollar | Amount <br> 9,876.5432 U.S. Dollar |
| Change Type | | | |
| Changes To Line Items: | | | |
| **Line Item Schedule** | | | |
| Schedule Line ID <br> 1 | | | |
| Quantity <br> 123.0000 | UOM <br> Each | | |
| *Requested Delivery Date: <br> Jun 13, 2009 05:00 PM PST | | | |
| Notes: | | | |
| *Date: <br> Jun 13, 2009 05:00 PM PST | Date Qualifier <br> ContractualDeliveryDate | | |
| ABCD Rating | | | |
| **Product Identification** | | | |
| Other Product Qualifier <br> ContractNumber | Other Product Code <br> ABC-01-2345 | Other Product Code Ext | |
| Standard Part Number Qualifier | Standard Part Number | Standard Part Number Ext | |

Page 1 of 7

FROM FIG. 3D

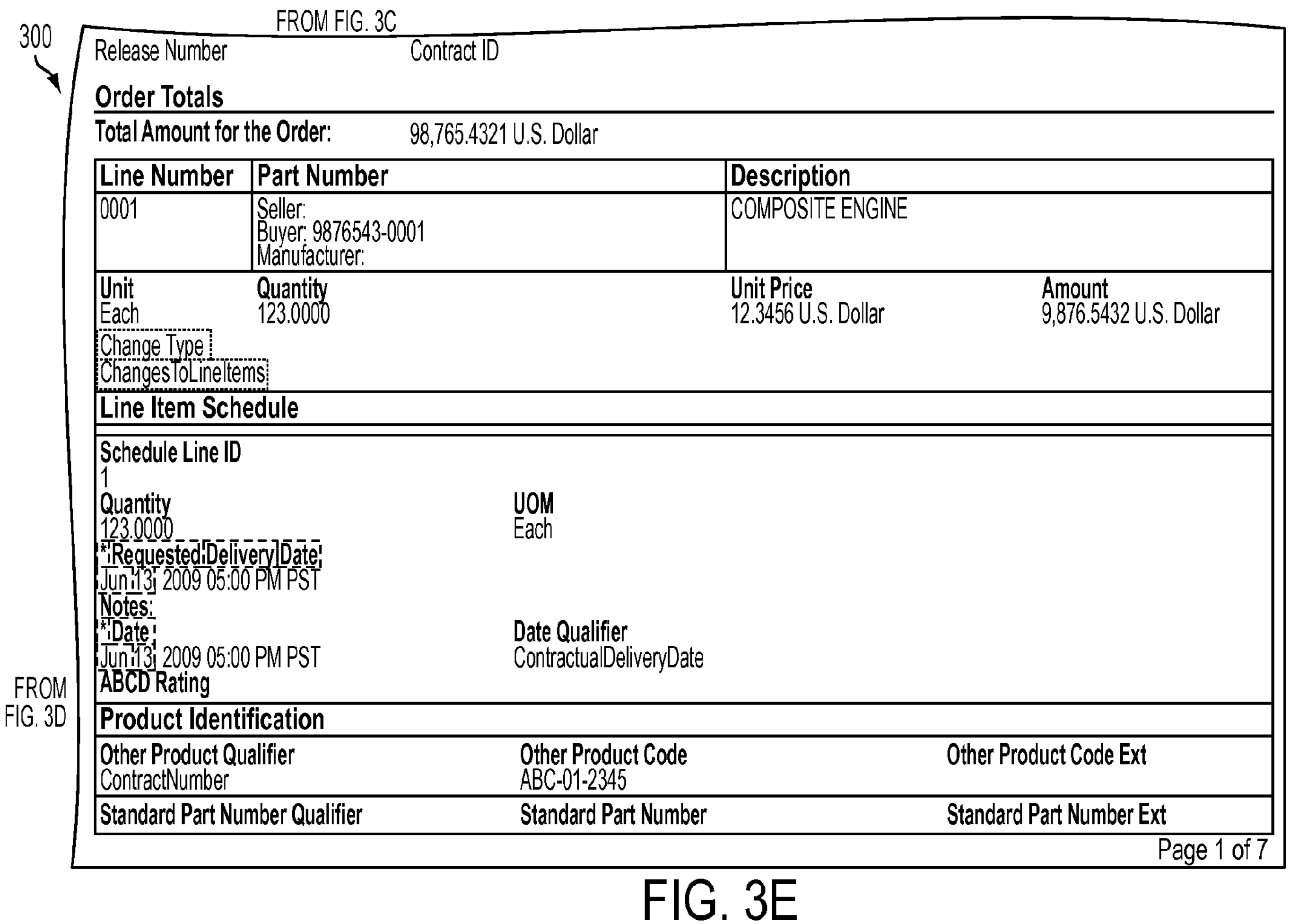

FIG. 3E

FINE-GRAINED VISUAL DOCUMENT FINGERPRINTING FOR ACCURATE DOCUMENT COMPARISON AND RETRIEVAL

BACKGROUND

The present application is directed to the imaging arts and more particularly to document comparison and retrieval.

An issue that exists in the area of document comparison is related to the comparison of two given documents and the ability to automatically detect and highlight any changes in content or layout placement between the two. Another issue is related to the recognition of the content of a document and the use of the recognition to retrieve similar or related documents from a document collection.

The solution to either of the above problems relies on the ability to identify matching document content. Existing methods attempt to directly access the document content. However, dealing with arbitrary document content can be difficult. The document content can frequently contain application-specific information or be in a complex proprietary format that is not readily amenable for direct identification and matching of content between documents.

INCORPORATION BY REFERENCE

U.S. application Ser. No. 12/147,624, Filed Jun. 27, 2008: Method And System for Finding A Document Image In A Document Collection Using Localized Two-Dimensional Visual Fingerprints, by Kletter, Saund, Janssen, Atkinson, herein incorporated by reference in its entirety.

U.S. application Ser. No. 12/147,867, Filed Jun. 27, 2008: System And Method For Finding Stable Keypoints In A Picture Image Using Localized Scale Space Properties, by Kletter, herein incorporated by reference in its entirety.

U.S. application Ser. No. 12/163,186, Filed Jun. 27, 2008: System And Method For Finding A Picture Image In An Image Collection Using Localized Two-Dimensional Visual Fingerprints, by Kletter, herein incorporated by reference in its entirety.

U.S. application Ser. No. 12/701,127, Filed Feb. 5, 2010, Currently Pending: Effective System And Method For Visual Document Comparison Using Localized Two-Dimensional Visual Fingerprints, by Kletter, herein incorporated by reference in its entirety.

BRIEF DESCRIPTION

A method and system generates fine-grained fingerprints for identifying content in a rendered document. It includes applying image-based techniques to identify patterns in a document rendered by an electronic document rendering system, irrespective of a file format in which the rendered document was electronically created. The applying of the image-based technique includes identifying candidate keypoints at locations in a local image neighborhood of the document, and combining the locations of the candidate keypoints to form a fine-grained fingerprint identifying patterns representing content in the document.

BRIEF DESCRIPTION OF THE DRAWINGS

FIGS. 1A-1C show a first page of a source PDF document;

FIGS. 2A-2C show a first page of a revised PDF document;

FIGS. 3A-3E show the output PDF file from the proposed method of this application;

DETAILED DESCRIPTION

Figure 3A:
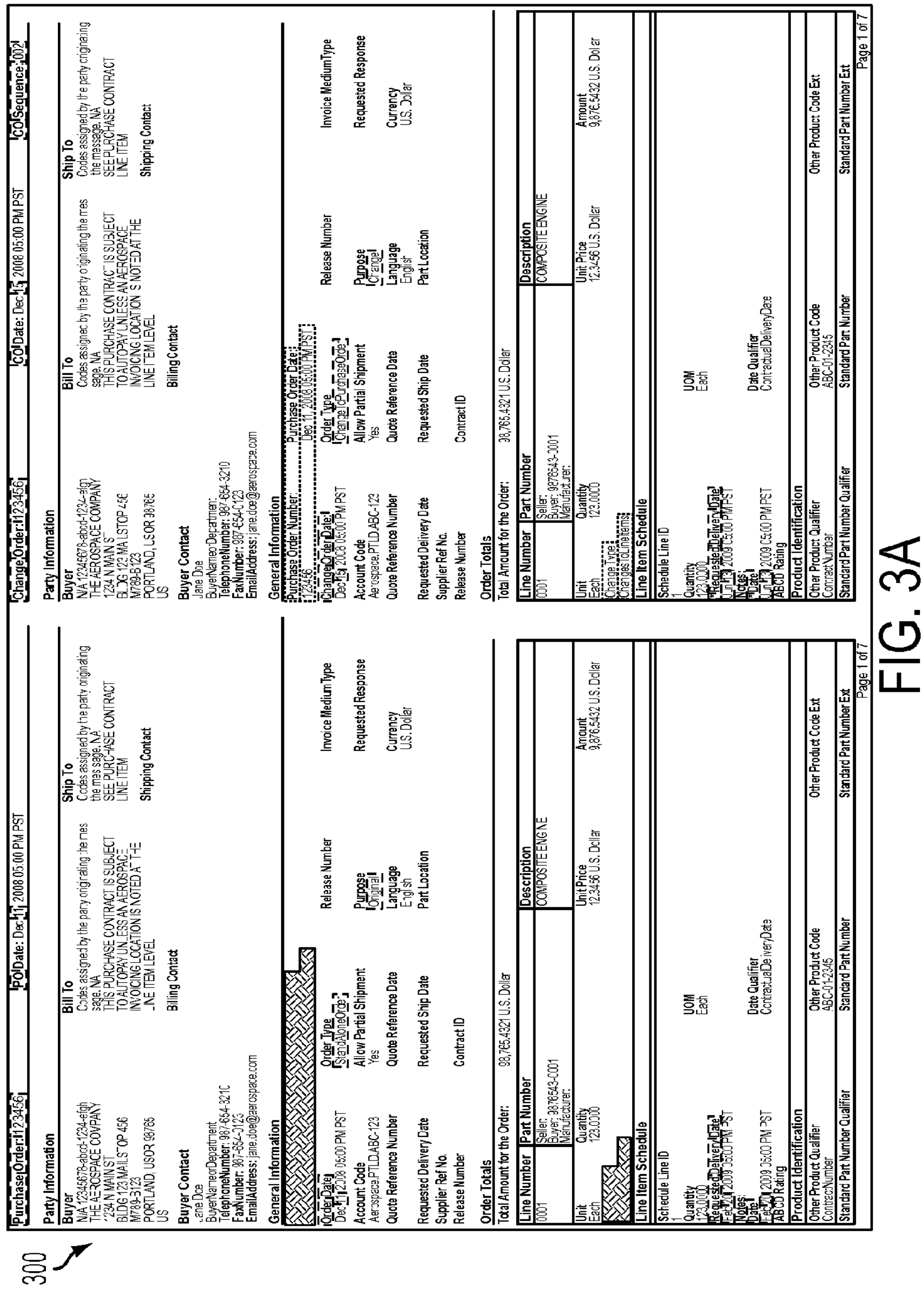

There are a number of existing solutions to the problem of comparing two rendered images, one being a source image and the other being a revised version of the source image. In particular such solutions are directed to documents in a portable document format (PDF). Examples include utilities such as Compare PDF by AKS Labs, Diff PDF by AJC Software, Acrobat Professional from Adobe Systems Inc., as well as Workshare Professional from WorkShare Inc.

Many of the available low-cost PDF compare programs work by extracting the text content out of the PDF files and performing a line-by-line text comparison. The simple programs of this type are, however, unable to cope with the complexity of arbitrary PDF layout and content fragmentation. In many cases the programs attempt to compare the fragmented content directly, and this leads to problems such as an inability to differentiate between text that is not visible on the page and the ambiguity with text based comparison, especially for documents that contain many repeating phrases in formal language, such as found in business and/or legal documents.

Only a few of the more advanced high-end PDF compare programs are capable of producing a visual comparison. However, the objective of these programs is different than the implementations to which the concepts of the present application are to be applied. The existing uses are primarily aimed at showing the change history perspective rather than attempting to produce a visually accurate side-by-side page comparison view. Adobe Acrobat Professional, for example, can circle the differences on a page, but the data is not aligned between the two files. Programs such as WorkShare Professional attempt to reconstruct and display the changes using sequences of crossed-out and revised text that change the appearance and layout of the page.

It has been found that the quality and effectiveness of the above solutions deteriorate rapidly with the page layout complexity.

Dealing with arbitrary document content can be difficult. The document content can frequently contain application-specific information or be in a complex proprietary format that is not readily amenable for direct comparison. In addition, when documents are conveniently converted to other formats such as PDF, their content is often fragmented and re-structured for efficient viewing, and much of the original high-level application specific content may not be preserved for the comparison.

The present application describes concepts that allow for a different approach to document comparison. Instead of attempting to directly compare text content as done in existing methods, in the present application the content of a document is rendered and image-based techniques are then used to identify patterns on the document. The rendered image is a universal representation that reflects what the user sees on the pages of the document, and eliminates the need to interpret the original document content with application-specific information and complex proprietary formats. Using these image based techniques, further processing can be implemented to look for similar patterns between different pages in order to hi-light those differences. The success of such image-based matching depends on the ability to accurately identify image patterns to allow for an accurate comparison of the identified patterns between the source document and the revised document.

In this application an effective 2D fine-grain fingerprinting method and system is disclosed which may be used for identifying page content of a document to permit for the matching of document content between a source document and a revised document and/or the retrieval of matching images from a database of images. The method and system are based on the identification of candidate keypoints at locations in a local image neighborhood of the document and the combining of the candidate keyword locations in a specific manner to form distinct 2D fine-grain fingerprints identifying patterns that represent content in the document.

The inventor has previously introduced concepts related to visual fingerprints as disclosed in:

U.S. application Ser. No. 12/147,624, Filed Jun. 27, 2008, Currently Pending: Method And System for Finding A Document Image In A Document Collection Using Localized Two-Dimensional Visual Fingerprints, Kletter, Saund, Janssen, Atkinson.

U.S. application Ser. No. 12/147,867, Filed Jun. 27, 2008, Currently Pending: System And Method For Finding Stable Keypoints In A Picture Image Using Localized Scale Space Properties, by Kletter.

U.S. application Ser. No. 12/163,186, Filed Jun. 27, 2008, Currently Pending: System And Method For Finding A Picture Image In An Image Collection Using Localized Two-Dimensional Visual Fingerprints, by Kletter.

These above mentioned disclosures may be thought of as coarse fingerprinting. What was taught in the above disclosures provides context and background teachings for the fine-grain fingerprint concepts of the present application, but the fine-grain fingerprint concepts are distinguished from coarse fingerprints in aspects of their application, structure and operation.

One particular difference is that the coarse fingerprinting methods are designed for situations of noisy low-quality camera type input that is subject to much degradation such as noise, lighting variations and perspective distortions, etc. On the other hand, in the context of document content comparison to which the teachings of the present application apply, good rendering quality of electronic content is usually possible, thereby requiring other processing techniques.

Further, coarse fingerprinting concepts do not check each pixel in an image, rather only those keypoints (e.g., in some embodiments maybe several hundred out of a potential set of thousands) determined to be important to identifying searched for images are used and thus the associated pixels.

In this application, the fine-grain fingerprinting techniques are designed to check each pixel of the images in the source and revised documents in order to distinguish a single character or even a part of a character change in a word, and thus the fine-grain fingerprint of the present application will use all extracted fingerprints. This permits the present concepts to be used in a system that identifies and highlights every change in a document, no matter how small. So when a person views the source and revised documents side-by-side they will see all changes. The fine-grain fingerprint techniques described herein also lower the memory and computational overhead to obtain the fine-grain fingerprints so the present concepts may also used in retrieval of images in a large-image database.

Computing fine-grain fingerprints is faster than OCR (Optical Character Recognition) operations, and fine-grain fingerprinting is superior to OCR in that it can handle any type of marks on the page such as line-art, drawings, handwritten text, and other such items known to be difficult to reliably OCR, for example, in addition to machine printed text. The resulting fine-grain fingerprints are highly distinctive and effective in finding 2D visual patterns of content with high performance and accuracy.

When performance speed is not an issue, the fine-grain fingerprinting results can be combined with OCR and other image-based techniques such as shape recognition, template or image matching, or texture analysis, for example, to identify other types of content in the rendered image for the purpose of refining the matching by content type.

The 2D fine-grained visual fingerprints described in this application are used in one implementation for identifying and matching document content. The fine-grain fingerprints capture unique two-dimensional localized aspects of the content appearance, are robust and highly distinctive; fast for lookup; compact for storage requirements; and scalable to large document sizes. They can handle any document content and are much more efficient to compute than OCR.

FIGS. 1A-1C illustrates an example of a first page of a source PDF document 100, and FIGS. 2A-2C illustrates an example of a corresponding first page of a revised PDF document 200. Given the two documents, an objective is to compare the two documents, detect and highlight any changes in content or layout placement, and visually make the changes stand out in an effective, intuitive, and easy to see manner. FIGS. 3A-3E illustrates an output 300 of a comparison of the first page inputs in FIGS. 1A-1C and 2A-2C which may be obtained using the present method and system based on fine-grain visual fingerprints.

Even though the content of FIGS. 1A-1C and FIGS. 2A-2C is relatively simple and comprised of semi-structured text in a form-like layout, it is generally difficult for people to quickly scan such pages and manually point out all changes. The human brain is capable of readily picking up large differences, but when the overall page structure and layout is similar it requires a high level of visual cognitive ability and concentration to successfully recognize subtle changes. Customer service representatives that receive contract changes and amendments similar to the ones shown in FIGS. 1A-1C and 2A-2C must comb the documents looking for changes. The manual comparison process is time consuming, tedious, and prone to error. Even an experienced customer service representative quickly gets tired after some time, and the error level rises. The consequences of missing a single change such as a quantity or delivery date change may have significant business and risk impact to the company.

As can be seen in FIGS. 3A-3E, all changes to FIGS. 1A-1C and/or 2A-2C are accurately highlighted, and because the content is always aligned, it is easy for the user to visually compare the content of the two images in a side-by-side view and quickly recognize the changes. For example, by comparing pairs of FIGS. 3A-3E, in a side-by-side display or print.

The input pages to be compared are processed sequentially. In this embodiment, the fine-grain visual fingerprints are used to identify similar patterns in document content. The 2D visual fingerprints are independently extracted for each document page and compared, and the resulting changes are highlighted in place as shown in FIGS. 3A-3E. The accuracy of proposed method of this application enables the high quality output.

Figure 4:
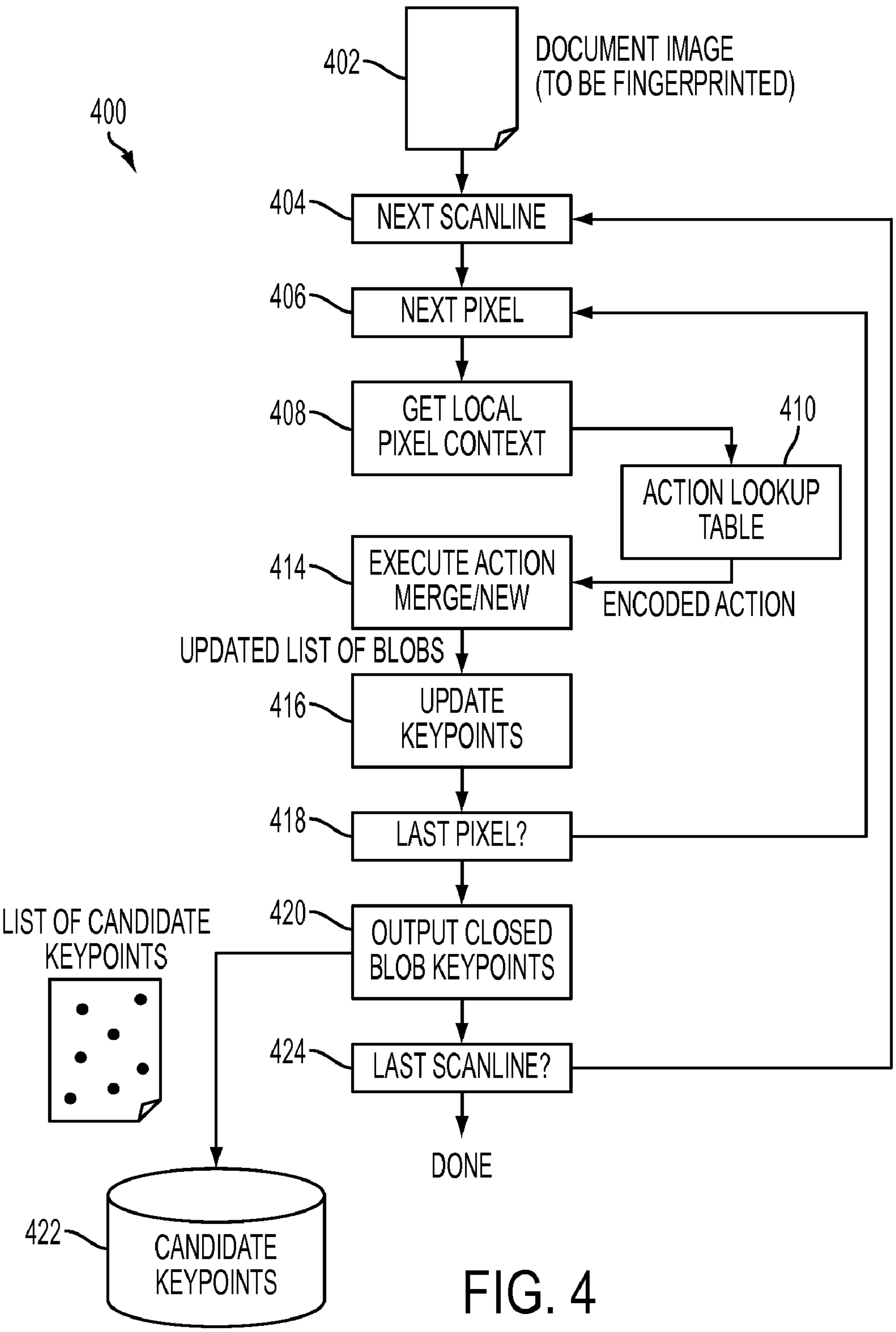
FIG. 4 shows a method of identifying blobs and candidate keypoints.

Turning now to FIG. 4 illustrated is a fine-grain fingerprint generation method 400 which identifies blobs and candidate keypoints, for use in generating fine-grain fingerprints of a document image. In this application keypoints are understood to be identifiers of distinctive locations in the image such as corners, junctions, and\or light or dark blobs, where blobs include groups of pixels of an image being investigated, and candidate keypoints are understood to be associated with locations of distinctly identifiable visual patterns of content of the document in corresponding partial local pixel neighborhoods of blobs. The final set of candidate keypoints are selected from among a set of keypoints identified and iteratively merged and refined during blob processing The method 400 progresses down a supplied document page 402 in regular raster scan order, one scanline 404 at a time. For each scanline, the image pixels are examined sequentially, one pixel 406 at a time. At each current pixel location, method 400 determines if the current pixel is a member of a new or previously existing blob, and in addition, if the current pixel location is to be considered as a candidate keypoint for fingerprinting.

In one embodiment this method is a fast single-pass algorithm. The method 400 utilizes a small neighborhood of pixels 408 around a current pixel of interest to iteratively build up blob structures and keypoints for the entire page. The algorithm has low memory requirements in that it only uses one previous scanline of the image, and the computational load is minimized by pre-encoding and storing in advance all the possible blob processing actions in an action lookup table 410.

For each current pixel location, pixel neighborhood context 408 is gathered and assembled together to form an address of the action lookup table 410. The content of the action table at this address defines the action that is to be applied at the current pixel location, based on the configuration of neighboring pixel values and the previous blob assignments. The appropriate action is identified and fetched out from among actions stored in the action lookup table 410.

Although there could be many combinations of input pixel values and previous blob assignments, the number of possible resulting actions is rather limited in practice. Examples of typical actions include such items as: (1) assign a new blob to the current pixel; (2) merge the current pixel with an existing previous blob, which may be in one of the following locations: on the left, top-left, top, or top-right of the current pixel; (3) combine two existing blobs together and merge the current pixel into the combined blob; and so on. The small number of possible actions is conveniently stored in the action table for fast and efficient lookup.

The appropriate action for the current pixel of interest (based on the generated address) fetched from the action table is then executed 414. As a consequence, the current pixel content may be added to an existing blob, or a new blob may be allocated for the current pixel of interest, or two previous blobs may be merged together, etc. Each blob is represented by a data structure in a system memory that is being manipulated. In addition, a separate blob ID image is created and updated by the execution 414, one pixel at a time. The final dimensions of the blob ID image are the same as in the original document image. Each pixel value of the blob ID image represents a current blob ID assignment for this pixel location.

After the action is executed 414 and the blob(s) status is updated in a system memory to reflect the current pixel state, a keypoint update operation 416 determines if the current pixel location is a candidate keypoint. Keypoints are initially allocated upon the discovery of a new, previously unseen blob. In one embodiment of the present application two opposing types of keypoints are used: (1) Type-1 keypoint that seeks to advance in the top-left direction; and (2) Type-2 keypoint that seeks to advance in the bottom-right direction. For each current pixel location, the position of an existing keypoint may be: (a) updated relative to a previous position; (b) a new keypoint may be assigned; or (c), an existing keypoint may be removed based on predefined conditions. For example, if the conditions are appropriate, the position of a Type-2 keypoint on the previous pixel of the current scanline may be updated to the current pixel position, or a new keypoint may be introduced at the converging intersection of two existing blobs (e.g., in one example in the shape of two blobs that come together in the shape of a V, as will be discussed in more detail in FIGS. 8A-8C).

The scanline processing continues in this manner, one pixel at a time, until the entire scanline has been processed and the last pixel 418 in a scanline has been encountered. At this point, a closed blob process 420 is launched to determine if any of the currently open blobs can be closed. A blob can be closed if no new pixels have been added to the blob during the current scanline operation, since there is at least one line of discontinuity between the blob and any other blob on a following scanline. All blobs that can be closed are processed to compute various attributes, and their resulting data and keypoints are outputted to a candidate keypoint file 422. The memory consumed by the blobs that have been closed by this operation is freed-up, and the closed blob ID's are recycled for subsequent reuse. A particular aspect of the described embodiment is the ability to process thousands of blobs on a document page in a small memory footprint by maintaining a small list of open blobs and eliminating, on-the-fly, any blobs that can be closed. The forgoing operations identify a set of keypoint candidates in a local image neighborhood, the locations of which are combined in a specific manner to form distinct 2D fine-grain fingerprints.

The scanline process 424 continues one scanline at a time, until finally the last scanline has been processed (e.g., DONE).

Figure 5A:
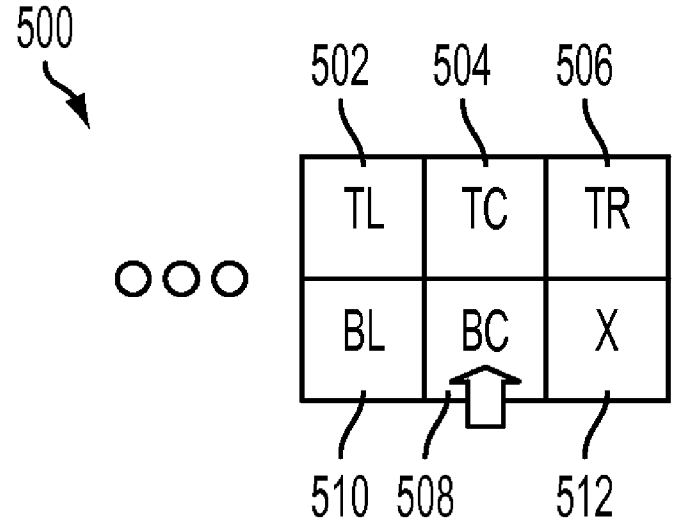
FIGS. 5A and 5B illustrate a sample pixel context.
Figure 5B:
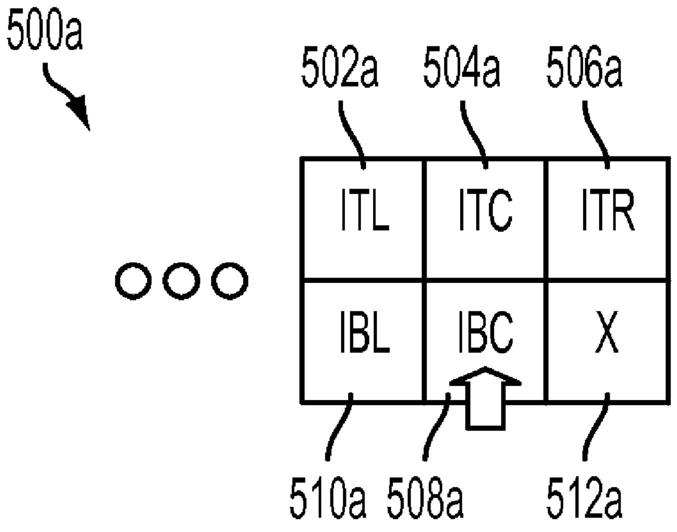

Turning to FIGS. 5A and 5B illustrated is a sample local pixel area content of a local image area in accordance with this application. FIG. 5A shows a local neighborhood of five document image pixels 500: three adjacent pixels on the previous scanline TL (502), TC (504), TR (506) on the left, center, and right of the current pixel position BC (508); and two adjacent pixels on the current scanline BL (510) on the left, and the current pixel itself BC (508). The pixel marked X (512) on the right of the current pixel BC (508) is not included since it will become the next current pixel as the process advances to the right.

FIG. 5B shows the corresponding pixel blob ID assignment context having the same spatial alignment as in FIG. 5A. Each pixel **502*a*-512*a* of the blob ID image 500*a*** represents the current blob ID assignment at this location. The specific number of pixels that forms the local neighborhood context may vary based on the particular implementation.

Figure 6:
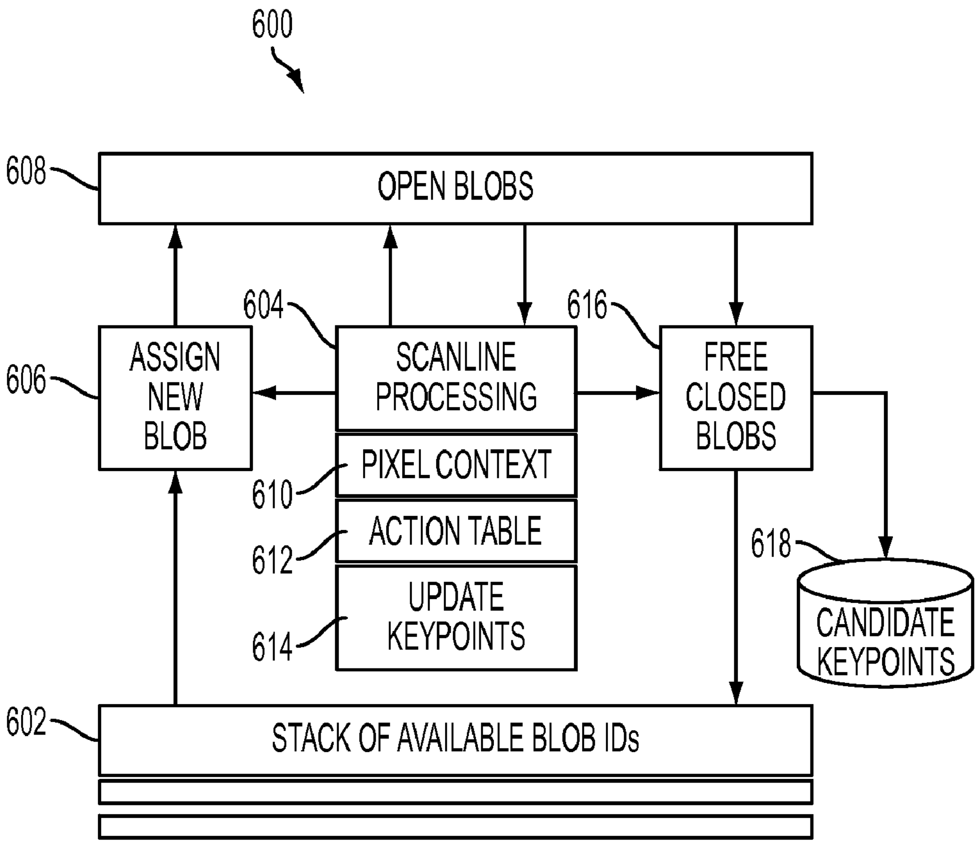
FIG. 6 is an illustration of the scanline processing method for creating, managing, and releasing blobs and updating keypoints.

Turning to FIG. 6 illustrated is the process of creating, managing, and releasing blobs as well as updating keypoint locations during the scanline operations 600. At an initialization time, the stack of available blob IDs 602 is initialized. As new blobs are encountered during the scanline processing 604, new blobs are allocated 606, and assigned IDs from the top of the stack of available blob IDs 602. A newly created blob is added to the managed list of open blobs 608. The data content of a blob consists of such items as: (1) the number of pixels; (2) running x-y sums to define the location of the blob; (3) the bounding box to define the boundary and spatial extent of the blob; and (4) pointers linking to the next and previous blob. This data is initialized on each new blob allocation.

The data content of open blobs is frequently updated during scanline processing, as new pixels are encountered and merged into existing open blobs. For example, as new pixels are added, the number of pixels is incremented; the bounding box is updated to reflect the current pixel position, and so on. An action code determines which open blobs are to be updated, if any, at each pixel cycle. The action code is obtained by gathering pixel context 610 in a local neighborhood and combining it to form an address to access the action lookup table 612. The appropriate action is then fetched from the action lookup table and executed. The action indicates which open blobs are to be updated and possibly merged together. In addition, the keypoint locations may also be updated 614 in accordance with the current pixel situation.

Finally, at the end of each scanline, any blobs that can be closed 616 are written to the candidate keypoints file 618, with associated keypoints (i.e., candidate keypoints associated with the closed blob). Thereafter the memory holding the open blob is released; and the corresponding open ID is recycled back into the stack of available IDs 602 and made available for new allocation. This completes the blob cycle.

Figure 7A:
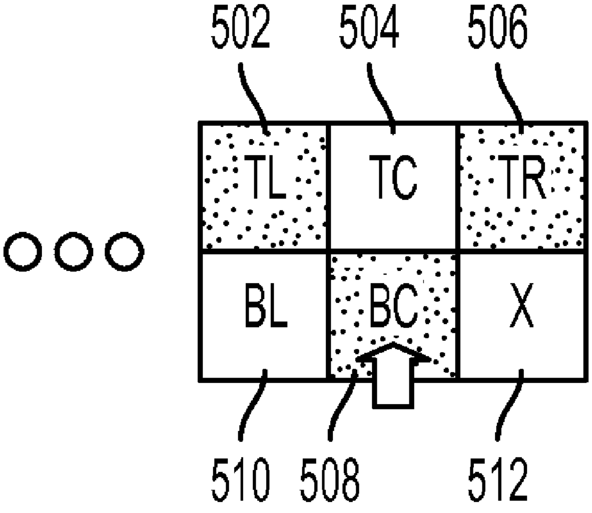
FIGS. 7A and 7B illustrate a merger action between two previously open blobs.
Figure 7B:
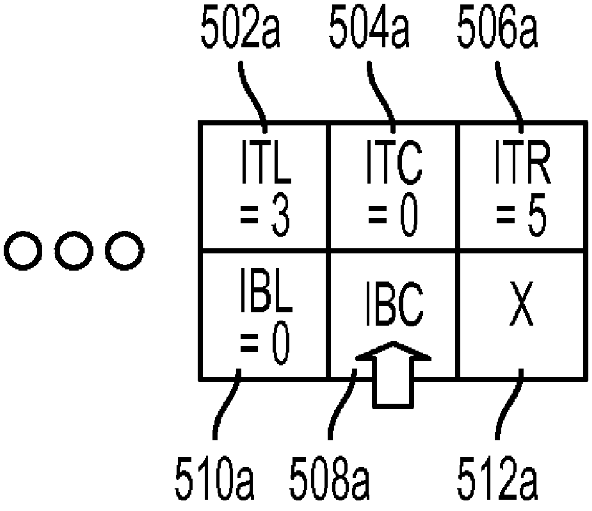

With attention to FIGS. 7A and 7B illustrated is an example of a merger action between two previously open blobs. In this example, the current pixel BC (508) is determined to be of the same type as TL (502) and TR (504), while BL (506) and TC (504) pixels are unassigned to a blob (corresponding blob ID=0). The pixel type is illustrated in FIG. 7A by the shading pattern. It should be noted that the meaning of "same type" pixels in this context is application specific; For example, TL, TR, and BC may be the black pixels in a binary document image, or they may be grayscale values above or below a certain threshold, or they may be RGB color pixels of similar values.

As can be seen in FIG. 7B, there are at least two open blobs on the previous scanline: the ITL blob (502*a*) with assigned ID=3 and the ITR blob (506*a*) with assigned ID=5. These are two independent open blobs that have not yet been connected during the previous scanline processing. Each of these blobs contain at least one pixel (additional pixels outside of the current pixel context are not shown). As can be seen in FIG. 7A, the current pixel of interest BC (508) forms an (8-way connectivity) bridge between TL and TR. In result, the previous ITL (ID=3) and ITR (ID=5) blobs are merged together to form a single blob, which is assigned the ID of the larger of the two blobs in terms of pixel count. After the merger, the ID of the smaller of the two blobs is freed up and entered back into the stack of available IDs for future reuse. The remaining merged blob is then updated to include the current pixel of interest. The current pixel blob ID IBC (508*a*) entry is assigned the merged blob ID number, and various blob fields such as the pixel count and bounding box information are updated accordingly. Based on the overall shape and content of the merged blob, a new keypoint candidate may additionally be introduced at the current pixel location.

Figure 8A:
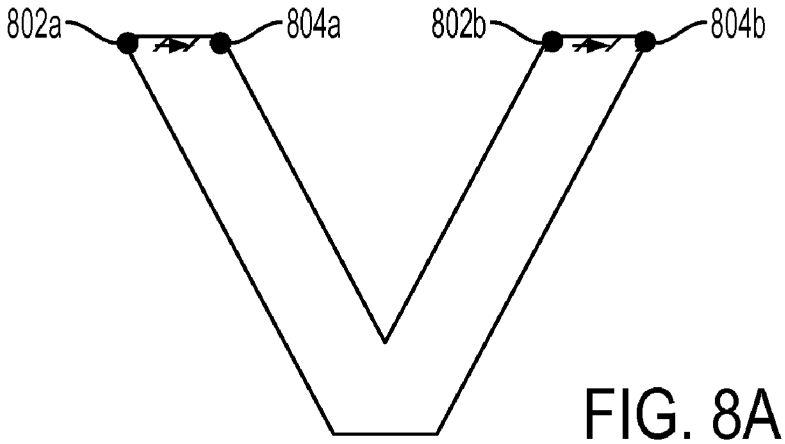
FIGS. 8A-8C illustrate the method of updating keypoints for a sample V-shaped blob.
Figure 8B:
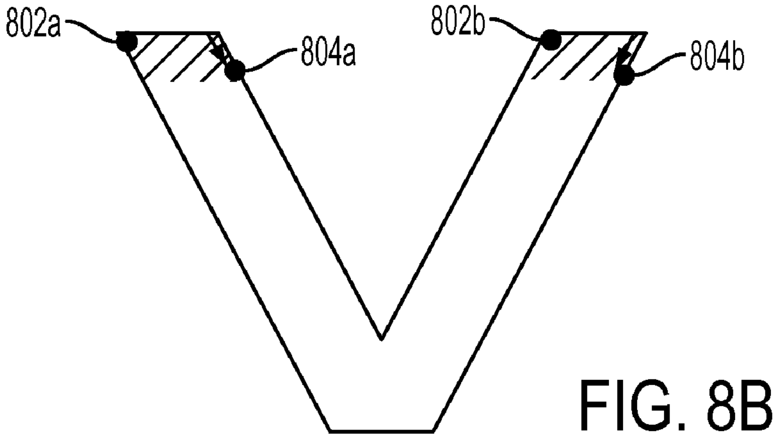
Figure 8C:
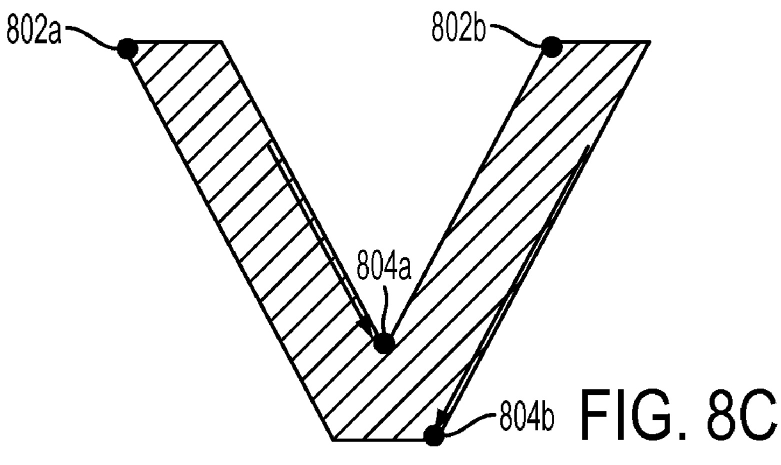

FIGS. 8A-8C illustrate one embodiment of the method of updating keypoints for the case of a sample V-shaped object blob 800. FIG. 8A shows the initial placement of two sets of opposing Type-1 and Type-2 keypoints (802*a*, 804*a* and 802*b*, 804*b*) upon initial discovery of two seemingly unconnected blobs on the topmost scanline, first intersecting the blob object. The Type 1 and Type 2 keypoints are initially assigned to the first pixel of each newly discovered blob. As new blob pixels are encountered along the first, topmost scanline processing, the Type-2 keypoint locations 804*a*, 804*b* are sequentially updated to the new pixel location on the right, as shown by the arrow direction in FIG. 8A. By the end of the topmost scanline, the Type-2 keypoint locations are eventually moved to the rightmost pixel on each arm. In contrast, the Type-1 keypoints 802*a*, 802*b* remain stationary in this example at the upper left corner pixel of each arm.

During the subsequent scanline, a downward force is applied to the Type-2 keypoints 804*a*, 804*b* as shown in FIG. 8B. For each subsequent scanline, the Type-2 keypoint locations are updated to travel one pixel down along the right boundary of each arm.

Eventually, upon reaching the scanline where the two arms finally come together, the two open blobs of each arm are finally merged together into a single blob. Because of the sharp angle geometry, the first Type-2 keypoint 804*a* remains stationary at the joining pixel location. The second Type-2 keypoint 804*b*, however, will continue to advance downward. The final keypoint locations are shown in FIG. 8C.

Figure 9:
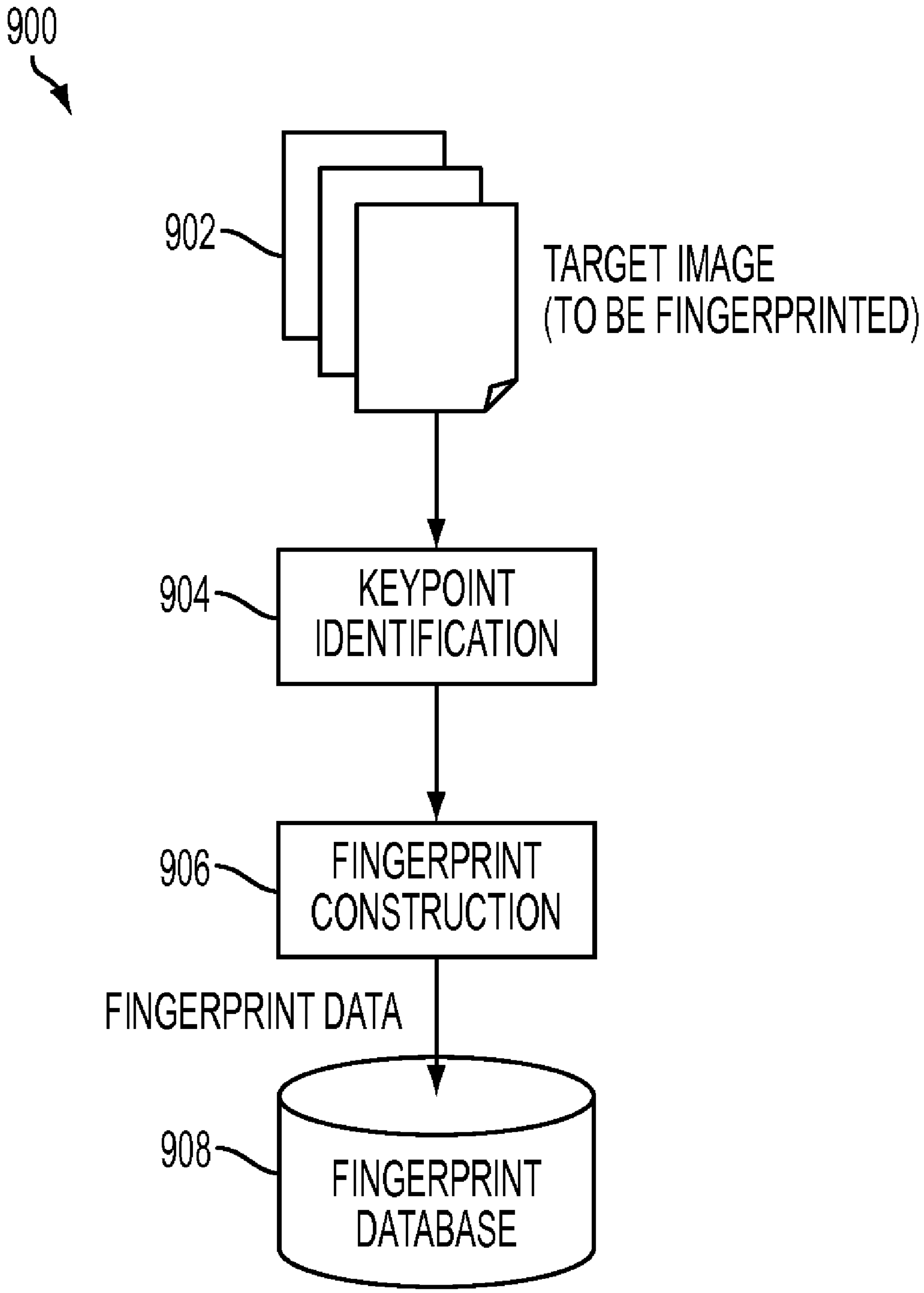
FIG. 9 is a general flow diagram for generating and storing fine-grain fingerprints.

With attention to FIG. 9, shown is a high-level flow diagram 900, illustrating steps for the generation and storing of the fine-grain fingerprints of the present application, as will be expanded upon below. In flow 900, a rendered document image is provided 902, and candidate keypoints of the image are identified 904. Using the candidate keypoints fine-grain fingerprints are constructed. Thereafter, data of the constructed fingerprints are stored in a fingerprint database 908.

Figure 10:
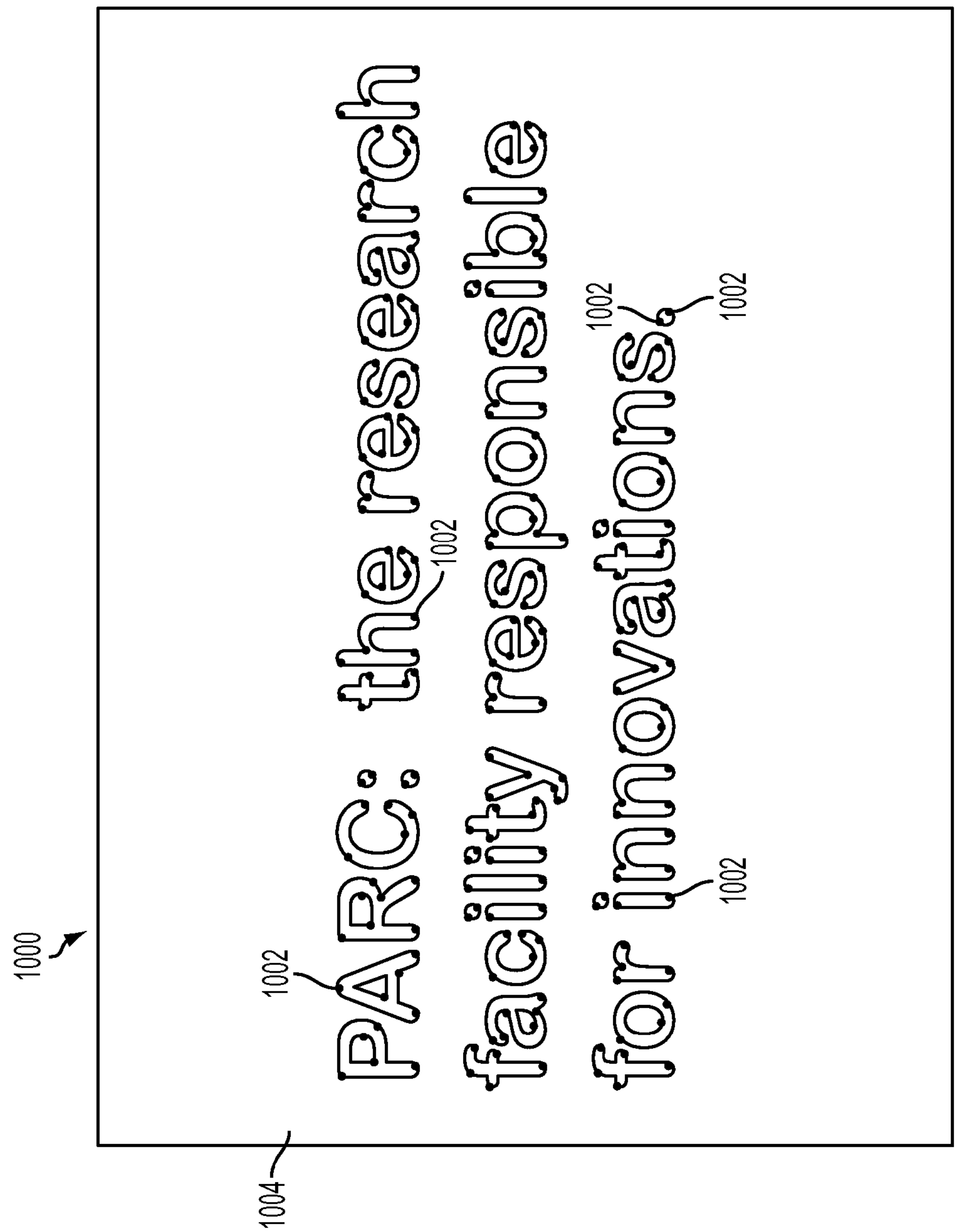
FIG. 10 is an illustration of the keypoint locations in a rendered document example.

Turning now to FIG. 10 illustrated are identified candidate keypoint locations in a rendered document example 1000. The candidate keypoint locations are shown as small circles 1002, superimposed over the original document content 1004. It should be noted that only a small number of the circles 1002 are shown for clarity. It is also to be appreciated the concepts of the present application are not restricted to text content. Any other type of marks on the page such as line art, drawings, and handwritten text will also contribute additional fingerprints.

As can be seen in FIG. 10, each blob character shape results in a small number of candidate keypoints 1002. Simple straight line segments and dots contain only two candidate keypoints. More complex character shapes may contain additional candidate keypoints. However, the number of candidate keypoints per character never exceeds six (6) in this example, with most character shapes requiring fewer candidate keypoints. Each character in this example has a distinct candidate keypoint configuration. The number of candidate keypoints is much smaller by far than the number of pixels that are needed to represent a character shape for accurate OCR recognition. It should be noted that the objective here is merely to find unique visual patterns, and it is not necessary to recognize each individual text character.

An aspect of the method and system of the present application becomes apparent with regard to FIG. 10. Particularly, the candidate keypoint locations tend to congregate, with one candidate keypoint each in the upper-left and bottom-right corners of each character shape. This makes the resulting candidate keypoints according to the method of this application very useful for estimating various parameters of the blobs such as the average character width and height, baseline position, and other text attributes such as ascenders and descenders. It can also be used to determine the skew of the page. It can also be effectively used to determine the grouping of characters represented by the blobs to form words by measuring the intra-character spacing distance.

For example, in one embodiment a histogram is constructed in order to determine the optimum word gap threshold. The width of each closed blob is estimated based on the horizontal span of associated keypoint locations. The estimated blob widths are quantized into a given number of bins. The histogram is an array of counts or frequency of estimated width occurrences in a page region. Once the histogram array has been computed, statistical methods are applied to determine the most frequent character width and error margins, from which an estimated character and word gaps are calculated. Any two blobs whose distance is smaller than word gap are linked together to form "words" using closed bidirectional links. It is convenient to use bi-directional links since blob discovery order may be different than normal text reading order. For example, the "d" blob in the word "order" is likely to be discovered first because of the extra vertical ascent and top to bottom scan order. With closed bi-directional links, it is easy to follow blobs in any order and rearrange discovery order in appropriate reading order based on horizontal keypoint coordinates. Since most Western languages have larger word gap than character gap, this process serves to group together blobs belonging to the same word, while keeping blobs of different words separated of each other. Additionally, the histogram can be adjusted for character height and/or dynamic text size variation within the page.

Various types of fine-grain fingerprints can be computed from the candidate keypoint locations depending on the desired feature size and level of accuracy needed. In one embodiment of this application, word size fingerprints are used for matching document content. Finer granularity fingerprints such as character or sub-character level are also feasible, and their use may be justifiable for specialized or more demanding applications. However, for general document comparison, word-size fingerprints appear to provide excellent results.

In one embodiment of this application, the distance from the rightmost Type-2 keypoint of one blob to the leftmost Type-1 keypoint of a subsequent blob (assuming normal text orientation) is computed and compared with an estimated word gap threshold. If the candidate keypoint distance is smaller than the word gap threshold, the two blob IDs are linked together using a bidirectional next field and a previous field found in each blob data structure. For example, consider the word "innovations." on the bottom of FIG. 10. For a good quality scan, each connected character corresponds to a blob, except the "i" characters have an extra blob for the dot. Each blob has a previous field and a next field. Due to vertical extent, the first blobs to be discovered are likely to be the "t" and two "i" characters. Since the distance between the "t" and subsequent "i" is below word gap the next field of "t"-blob is linked to the "i"-blob index, and likewise the previous field of "i"-blob is linked to the "t"-blob index. As additional blobs are discovered, they are added to the doubly linked list by inserting and correspondingly updating the associated next and previous fields. The first and last linked blobs are additionally linked to each other, using the next and previous fields, to form a circular loop which allows walking over member blobs in any order from any staring point and re-arranging each group of blobs in reading order based on keypoint locations. The linking process serves to group subsequent blobs into words while maintaining the internal order of blobs within each word.

Figure 11:
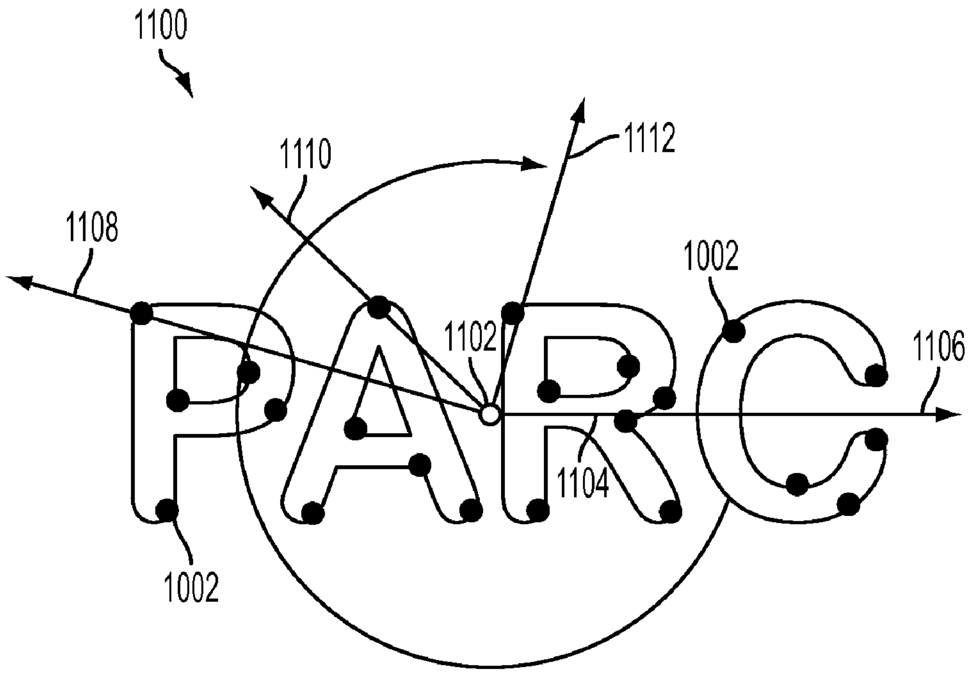
FIG. 11 is an illustration of a method of matching query fingerprints and counting document hits.

FIG. 11 illustrates an example of a magnified word region 1100 in the upper left corner of FIG. 10. The candidate keypoint locations are shown again by circles 1002. For each word, a fine-grain fingerprint is computed from the associated candidate keypoint locations 1002. The method of computing the fine-grain fingerprint is a variation of the fingerprinting methods in U.S. application Ser. No. 12/147,624, 12/147,367 and 12/163,186. First, the center location 1102 of all candidate keypoints in each "word" group of bidirectionally linked blobs is calculated. The center location is also considered to be the fingerprint location. Next, the candidate keypoints are sorted in increasing clockwise orientation order. The sorting is done on both the orientation and distance. The primary sorting order is by increasing clockwise orientation order as shown in FIG. 11. To more fully illustrate the searching represented in FIG. 11, it is first imagined that a thin metal ruler that cannot be bent is being used. The ruler is placed along 1106 and it is pinned at the left end at the origin point 1102. With the one end pinned, the ruler can only be rotated clockwise or counterclockwise. The ruler represents line rays emanating from the origin at a given orientation angle. As the rigid ruler is moved in a clockwise direction, the first point encountered is 1104—not any other small circle. The second point encountered would be the bottom far-end opening of the C character (closest below 1106), and so forth. The order of encounter is by orientation angle, not distance. As explained below only when two or more points are at about the same angle, will further ordering take place by increasing distance.

The first candidate keypoint in this example is 1104, which is the first encountered from the reference orientation 1106. Likewise, the candidate keypoints 1108, 1110, and 1112 are entered in this order. However, if two or more points have roughly the same orientation (the difference within a predefined tolerance level), the points are sub-ordered by increasing distance for all the points of about the same orientation.

Once the ordering of the keypoints around the center location has been established, a fine-grain fingerprint is computed from the distances of the keypoints to the center location. For each keypoint in turn, an integer is determined by quantizing the distance from the keypoint to the center location using a set of predefined quantization thresholds. The quantization threshold values are determined empirically by studying the distribution of keypoints. The quantization of each keypoint distance is normalized relative to the largest distance between any two keypoints of this word and number of quantization levels. For clean electronic document input, a small number of quantization levels such as N=2 or 4 provides excellent results. The quantized distance values are concatenated together to form fingerprints, which are basically distinct long sequences of a plurality of quantized distance integer values. Thus fingerprints can be interpreted as high-dimensional vectors in multi-dimensional space, whereby the distinctness of fingerprints increases with the dimensionality. Since the number of keypoints per blob is somewhat variable, between 2 and 6 in the example shown in FIG. 11, the resulting number of distances to be quantized being variable, the fingerprints are padded to a fixed average fingerprint length, typically a power of two number. Occasional larger fingerprint sequences for unusually dense sets of keypoints are truncated using modulo some large number P, selected to limit the maximum fingerprint size. That is, any extra bits of data exceeding the specified fingerprint size are folded back and modulo-added to the fingerprint sequence to ensure the fixed fingerprint size. Additional criteria may further be applied to filter out less distinct patterns of keypoints in cases of unusually long sequences.

Figure 12:
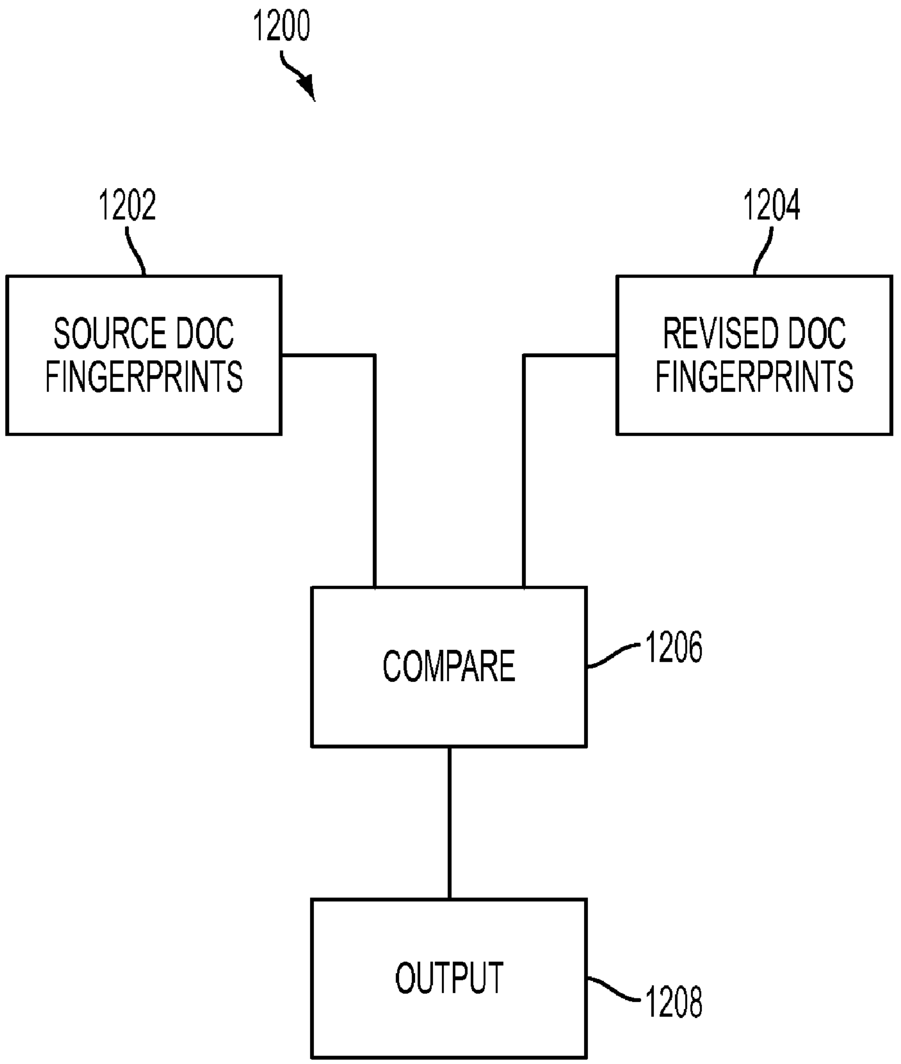
FIG. 12 is a general flow diagram for comparing and/or retrieving the fine-grain fingerprints of a source document and a revised document.

Turning now to FIG. 12, shown is a high-level flow diagram 1200 illustrating one embodiment for comparing the source document and the revised document as depicted in FIGS. 1-3. In steps 1202 and 1204, the fine-grain fingerprints for the source and revised documents have been obtained. In step 1206, a compare operation is undertaken using the information from steps 1202 and 1204, where similar locations on each document are compared to determine if they have similar image patterns as defined by the acquired fine-grain fingerprints. The compare may be any of a number of comparing operations that look to identify difference between documents being compared. Thereafter, in step 1208, an image or images are output showing the results of the compare. It is to also be understood the flow diagram 1200 may also be used to represent a compare of one document to a plurality of documents, wherein step 1201 represents a single document and step 1204 a database of documents. In this case, the compare searches the database, and the output in step 1208 includes images matching the image in step 1202.

Figure 13:
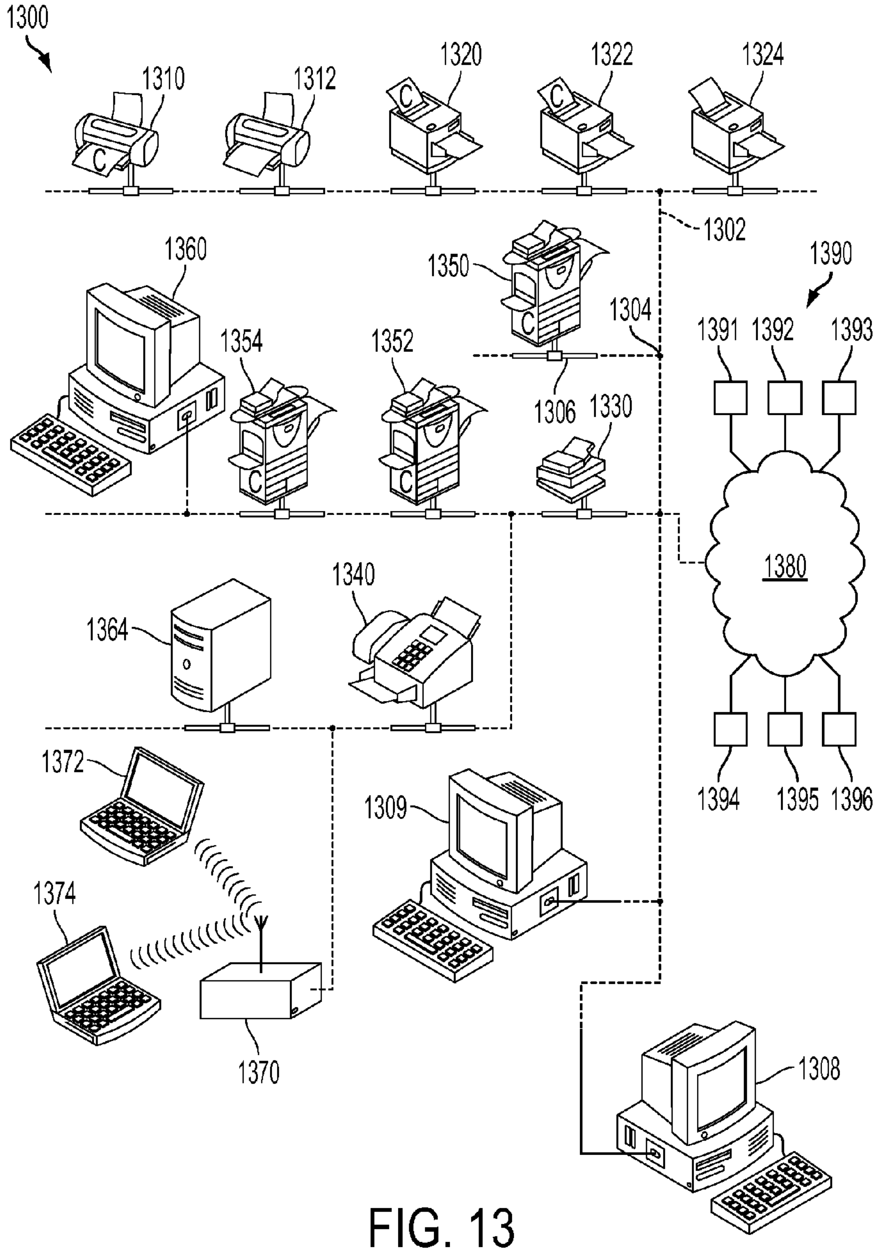
FIG. 13 depicts a system in which the concepts of the application may be achieved.

The system and method as described herein may in some embodiments work within the parameters of a computer network as illustrated in FIG. 13. The computer network 1300 in this embodiment is comprised of a series of wires 1302, many of which may branch or join with a third wire 1306 at a wire junctions 1304, connects a standalone peripheral device or passes through a peripheral to connect to other devices, such as computers 1308, 1309, wherein a computer may be considered a peripheral device. The network may incorporate a color printer 1310 or other than color printer 1312 as well as at least a color laser printer 1320, 1322 or one other than color laser printer 1324. The network may also incorporate a scanner 1330, or a fax machine 1340, a photocopier 1350, a color photocopier 1352, or a combination color printer/scanner/fax machine 1354. The network may also contain a personal computer and/or standalone computer terminal 1360, or stand alone hard drive data storage medium 1364. The network may also contain a wireless network transmitter receiver 1370 and interface with at least one laptop computer 1372, or a plurality of laptop computers 1374. The network may also interconnect with any form of network 1380 including but not limited to the Internet, an Intranet or other communication network. Through use of an interface with another form of network, the present system and method may interface with a plurality of peripheral data capturing devices 1390 including, but not limited to a digital still camera 1391, a digital video camera 1392, a cellular telephone 1393, a scanner 1394, a personal data assistant 1395, or a document indexing system 1396. It is to be understood the present concepts may be implemented in networks having various combinations of the above components, going from a network having a single device to one which includes thousands or more connected devices. Further, various ones of the above components may have memory storage areas arranged in any of a number of known configurations which may be useful in implementing the concepts to be described. The storage areas may be RAM, ROM, Flash Memory or other memory types which can hold software incorporating the concepts of the present application. Other memory storage areas may be configured to hold various digital images in any of a number of database formats.

Still further various ones of the components of FIG. 13, such as but not limited to the computers, include processors to process instructions from software loaded on or otherwise accessible by the components. It is to be understood various ones of the components having the processors may have more than one processor whereby processing of the instructions can be divided among the multiple processors. Alternatively, a single processor can operate to divide the instructions, whereby processing can occur in a multi-threaded environment.

Thus the foregoing describes a fine-grain visual fingerprinting method and system for electronic document content, which permits for the comparing of document content based on fine grained visual fingerprints. The method and system identifies 2D visual patterns in document content and, given a 2D visual pattern, quickly and accurately identifies similar content in other related documents. The method and system works with any type of document content using the rendered output instead of the original document content, which can frequently be application-specific and/or in a complex proprietary form.

The described fine-grain visual fingerprinting method and system alleviates the need to recognize individual text characters. Instead, localized fine-grain visual fingerprints that are computed from the locations of candidate keypoints in a local neighborhood are used. The fine-grain visual fingerprints are compact, robust and highly distinctive. They can easily distinguish a single character or part of a character change in a text word.

In the forgoing description, the method is a fast single-pass algorithm applied to automatically identify a small number of robust and reliable keypoints per blob. The number of keypoints is based on the layout complexity. In one embodiment the fine-grain fingerprints of a document are hashed into a hash table for effective lookup. A single lookup into the hash table then retrieves a list of all the candidate matching locations. Alternatively, the fingerprints information of a query document is used to determine the best matching document in a collection. The fingerprints are of high dimension which may be composed of a sequence of a plurality of quantized integers, which can be interpreted as a multi-dimensional vector space. In one embodiment they are hashed into a hash table, whose entries contain lists of linked fingerprint records. Each fingerprint record contains at least the identity of a particular fingerprint, and its value.

An aspect of the present application is the method of organizing the fingerprint information in a unique manner in order to facilitate fast and efficient fingerprint matching. In some embodiments a tree-based method called the Fan Tree as a method for indexing fingerprints, which are sequences of integers. Unlike common hashing techniques, the Fan Tree allows for efficient near-neighbor fingerprint search in a high-dimensional space (e.g., near-miss fingerprints with identical sequences except for one or a few digit changes), and is at least as fast as the hash table approach.

The foregoing disclosure addresses many shortcomings of the existing methods of document comparison and retrieval including:

1. Providing a fast and efficient method for finding similar visual patterns in electronic document content. A single lookup into a hash table containing the fine-grain document fingerprints is all it takes to retrieve a list of all the candidate matching locations.

2. The method and system is based on simple keypoint layout matching instead of using optical character recognition (OCR) and/or character shape matching. Advantage is taken of the ability of 2D visual fingerprints to identify matching locations with high performance and accuracy, and demonstrate that the method and system can achieve excellent matching results at a fraction of the heavy computational load and time consuming effort that is typically required for optical character recognition.

3. In contrast to existing text-based techniques, the fine-grain visual fingerprinting method of the present application is not limited only to machine printed text, and can reliably handle any types of marks of the page, including line-art, drawings, and handwritten text, for example.

4. The described fine grain visual fingerprints are much more compact and efficient to store and detect than the traditional OCR character shapes. Even though only a handful of keypoints are used per character, the method is highly effective and accurate in finding similar visual patterns on the page, and is far less prone to the types of errors and shape matching problems that commonly occur with OCR.

5. The developed fine-grain visual fingerprints method can detect a single character or part of a character change within a word for Western languages. The method can be naturally extended to support other multi-stroke languages by using finer fingerprint granularity in a straight-forward manner.

6. The method identifies a set of keypoint candidates in a local image neighborhood, the locations of which are combined in a specific manner to form distinct 2D fine-grain fingerprints. This approach uses a very low memory footprint by maintaining a limited set of open blobs at any given time, and by leveraging the reusable blob ID stack, whereby any blobs that can be closed are immediately outputted at the end of a scanline, their memory content is freed up, and the closed blob ID's are recycled for subsequent reuse. This allows the present method the ability to successfully handle tens of thousands of blobs on a document page with a small blob memory buffer that never exceeds a few hundred blobs at any one given time.

7. In certain embodiments two types of opposing keypoints are used in order to minimize the overall number of keypoints per blob: (1) Type-1 keypoint that seeks to advance in a top-left direction; and (2) Type-2 keypoint that seeks to advance in a bottom-right direction. For each current pixel location, the position of an existing keypoint may be: (a) updated relative to a previous position; (b) a new keypoint may be assigned; or (c), an existing keypoint may be removed based on predefined conditions. Additional Type-1 or Type-2 keypoints may be introduced in accordance with predefined run-length encoding considerations such as when two blobs merge together or split apart.

8. The keypoints identified according to the method of this application is also useful for a variety of other applications. The keypoint locations can be used for estimating the average character width and height. They can also be used for estimating additional text attributes such as the baseline position and extent of ascenders and descenders. They can be used for estimating the inter-blob and word spacing, and for grouping blobs into words. In addition, the keypoint locations can be used for estimating the page skew and\or text orientation. Moreover, the number of keypoints per blob provides a reliable indication of the inherent complexity of a blob object. A number of these properties are taken advantage of in computing fine-grain visual fingerprinting for successful document comparison and retrieval.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of generating fine-grain fingerprints for identifying content in a rendered document, the method comprising:

applying image-based techniques to identify patterns in a document rendered by an electronic document rendering system, irrespective of a file format in which the rendered document was electronically created, the applying of the image-based techniques including:

i. scanning, by at least one electronic processor, the rendered document one scanline at a time to identify image pixels, wherein at each current pixel a determination is made by the at least one electronic processor whether the local neighborhood of pixels corresponding to a local image neighborhood is a member of a new or previously existing local image neighborhood, ii. identifying candidate keypoints at locations in a local image neighborhood of the document, by the at least one electronic processor, and iii. combining the locations of the candidate keypoints to form fine-grain fingerprints indentifying patterns representing content in the document, by the at least one electronic processor.

2. The method according to claim 1 wherein the identifying of the candidate keypoints includes:

using a local neighborhood of pixels corresponding to the local image neighborhood, around the current pixel to build up a blob structure and keypoints for the document page;

assembling an address to an action look-up table that defines an action that is to be applied at the current pixel location, based on the neighboring pixel values and the previous blob assignments;

fetching the appropriate action out of the action look-up table based on the assembled address;

executing the fetched action, resulting in the current pixel content being at least one of, (i) added to an existing blob, (ii) having a new blob allocated to the current pixel, or (iii) merging existing blobs together at the pixel location;

updating the blob status to reflect the state of the current pixel;

determining if the current pixel location is a candidate keypoint;

moving to a next pixel location in a scanline under review and repeating the previous steps, and continue moving and repeating the processing until the end of the scanline under review is reached;

launching a closed blob process when the end of a scanline is reached to determine if any of the currently open blobs can be closed, wherein a blob can be closed if no new pixels have been added to the blob during the current scanline operation;

processing all blobs that can be closed to compute their attributes at the end of a scanline operation;

outputting the resulting attribute data and keypoints from the processed closed blobs to a candidate keypoint file at the end of the scanline operation; and moving to a next scanline when a final pixel on a preceding scanline has been processed and repeating the above processing steps until the final scanline is processed.

3. The method according to claim 2 wherein after the step of outputting the resulting attribute data and keypoints further including, freeing up memory that was used to store the open blobs that were processed to closed blobs and recycling closed blob ID's for reuse.

4. The method according to claim 2 wherein the blob can be closed if no new pixels have been added to the blob during a current scanline operation, since there is at least one line of discontinuity between the blob and any other blob.

5. The method according to claim 2 wherein a distance from a rightmost keypoint of one blob to a leftmost keypoint of a subsequent blob, assuming normal text orientation, is computed and compared with an estimated word gap threshold, further including:

i. if the candidate keypoint distance is smaller than the word gap threshold, the two blob IDs are linked together using a bidirectional next field and a previous field found in each blob data structure, ii. wherein the linking process serves to group subsequent blobs into words while maintaining the internal order of blobs within each word.

6. The method according to claim 1 wherein the forming of the fine-grain fingerprint includes forming the fine-grain fingerprints to be a word size.

7. The method according to claim 6 wherein the forming of the word size fingerprints includes:

calculating a center location of all candidate keypoints in a word or local neighborhood;

defining the center location as the fingerprint location;

sorting the candidate keypoints in an increasing clockwise orientation order, both for orientation and distance;

computing the fine-grain fingerprint by measuring distances of the keypoints to the center location; and determining an integer for each keypoint by quantizing the distance from the keypoint to the center location using a set of predefined quantization thresholds, the quantization threshold values being determined empirically by studying the distribution of keypoints.

8. The method according to claim 1 wherein the keypoints include at least two types of keypoints that seek to advance in a top-left direction and in a bottom right direction of a scanned object.

9. The method according to claim 1 wherein the candidate keypoint locations tend to congregate one candidate keypoint each in a upper-left and bottom-right corners of each character shape, making the resulting candidate useful for estimating various parameters, including average character width and height, baseline position, and text attributes including ascenders and descenders, skew of the page, and for grouping of characters to form words by measuring the intra-character spacing distance.

10. The method according to claim 1 wherein various types of fine-grain fingerprints can be computed from the candidate keypoint locations depending on the desired feature size and level of accuracy needed, including (i) word size fingerprints for matching document content and (ii) character or sub-character level fingerprints.

11. The method according to claim 1 wherein the document includes text.

12. The method according to claim 1 wherein the document includes at least one of line-art, drawings and handwritten text.

13. An image based method generating fine-grain fingerprints for identifying patterns in a rendered image, the method comprising:

supplying a rendered document page;

scanning the rendered document page one scanline at a time;

examining, for each scanline, image pixels of the document;

determining at each current pixel location if the current pixel is a member of a new or previously existing blob;

using a small neighborhood of pixels around the current pixel to iteratively build up the blob structure and keypoints for the document page;

storing, in advance, all possible blob processing actions in an action look-up table;

gathering the pixel neighborhood for each current pixel and assembling an address to the action look-up table that defines the action that is to be applied at the current pixel location, based on the configuration of the neighboring pixel values and the previous blob assignments;

fetching the appropriate action out of the action look-up table based on the assembled address;

executing the fetched action, resulting in the current pixel content being at least one of, (i) added to an existing blob, (ii) having a new blob allocated to the current pixel, or (iii) merging existing blobs together at the pixel location;

updating the blob status to reflect the state of the current pixel;

determining if the current pixel location is a candidate keypoint;

moving to a next pixel location in a scanline under review and repeating the previous steps, and continue moving and repeating the processing until the end of the scanline under review is reached;

launching a closed blob process when the end of a scanline is reached to determine if any of the currently open blobs can be closed, wherein a blob can be closed if no new pixels have been added to the blob during the current scanline operation;

processing all blobs that can be closed to compute their attributes at the end of a scanline operation;

outputting the resulting data and keypoints corresponding to the processed closed blobs at the end of the scanline operation;

moving to a next scanline when a final pixel on a preceding scanline has been processed and repeating the above processing steps; and forming distinct visual 2-D fine-grain fingerprints by combining locations of the keypoints identified with the processed closed blobs.

14. The method according to claim 13 wherein after the step of outputting the resulting data further includes, freeing up memory that was used to store the open blobs that were processed to closed blobs and recycling closed blob ID's for reuse.

15. The method according to claim 13 wherein the forming of visual fine-grain fingerprints includes identifying patterns in the document corresponding to word size fingerprints including:

calculating a center location of all candidate keypoints in a word or local neighborhood;

defining the center location as the fingerprint location;

sorting the candidate keypoints in an increasing clockwise orientation order, both for orientation and distance;

computing the fine-grain fingerprint by measuring distances of the keypoints to the center location; and determining an integer for each keypoint by quantizing the distance from the keypoint to the center location using a set of predefined quantization thresholds, the quantization threshold values being determined empirically by studying the distribution of keypoints, the quantization of each keypoint distance being normalized relative to the largest distance between any two keypoints of the word and the number of quantization levels.

16. The method according to claim 13 wherein the candidate keypoint locations tend to congregate one candidate keypoint each in the upper-left and bottom-right corners of each character shape, making the resulting candidate useful for estimating various parameters, including average character width and height, baseline position, and text attributes including ascenders and descenders, skew of the page, grouping of characters to form words by measuring the intra-character spacing distance.

17. The method according to claim 13 wherein a distance from a rightmost keypoint of one blob to a leftmost keypoint of a subsequent blob, assuming normal text orientation, is computed and compared with the estimated word gap threshold, if the candidate keypoint distance is smaller than the word gap threshold, the two blob IDs are linked together using the bidirectional next and previous fields in each blob data structure wherein the linking process serves to group subsequent blobs into words while maintaining the internal order of blobs within each word.

18. A document imaging system, including at least one electronic processor, configured to generate fine-grain fingerprints for use in identifying content in a rendered document, the system comprising:

an image-based system which identifies patterns in a document rendered by an electronic document rendering system, irrespective of a file format in which the rendered document was electronically created, the image-based system including, i. a scanning mechanism which electronically scans a document one scanline at a time to identify image pixels, wherein at each current pixel a determination is made by at least one electronic processor whether the local neighborhood of pixels corresponding to a local image neighborhood is a member of a new or previously existing local image neighborhood, ii. a candidate keypoint identifier configured by the at least one electronic processor to identify candidate keypoints at locations in a local image neighborhood of the document, and iii. a mechanism configured by the at least one electronic processor, to combine the locations of the candidate keypoints to form fine-grain fingerprints indentifying patterns representing content in the document.

19. The system of claim 18 wherein the image-based system identifies patterns in the document by the granularity of the size of words in the document.

20. The system according to claim 18 wherein the image-based system identifies patterns that are those of at least one of line-art, drawings and handwritten text.

* * * * *